United States Patent
Ryu et al.

(10) Patent No.: US 11,563,528 B2
(45) Date of Patent: Jan. 24, 2023

(54) METHOD AND DEVICE FOR PROVIDING HARQ FEEDBACK IN WIRELESS COMMUNICATION SYSTEM

(71) Applicant: Samsung Electronics Co., Ltd., Suwon-si (KR)

(72) Inventors: Hyunseok Ryu, Suwon-si (KR); Anil Agiwal, Suwon-si (KR); Jeongho Yeo, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/994,457

(22) Filed: Aug. 14, 2020

(65) Prior Publication Data

US 2021/0050954 A1 Feb. 18, 2021

(30) Foreign Application Priority Data

Aug. 14, 2019 (KR) .................. 10-2019-0099807

(51) Int. Cl.
*H04L 1/18* (2006.01)
*H04W 72/02* (2009.01)
(Continued)

(52) U.S. Cl.
CPC .......... *H04L 1/1819* (2013.01); *H04L 5/0055* (2013.01); *H04W 4/023* (2013.01);
(Continued)

(58) Field of Classification Search
CPC ..... H04W 58/02; H04W 28/04; H04W 76/14; H04W 4/70; H04W 6/02; H04W 28/02;
(Continued)

(56) References Cited

U.S. PATENT DOCUMENTS

| 10,237,717 | B2 | 3/2019 | Kim et al. |
| 2015/0023267 | A1 | 1/2015 | Lim et al. |

(Continued)

FOREIGN PATENT DOCUMENTS

| WO | 2015122629 A1 | 8/2015 |
| WO | 2019004688 A1 | 1/2019 |

(Continued)

OTHER PUBLICATIONS

M. H. C. Garcia et al., "A Tutorial on 5G NR V2X Communications," in IEEE Communications Surveys & Tutorials, vol. 23, No. 3, pp. 1972-2026, thirdquarter 2021, doi: 10.1109/COMST.2021.3057017. Feb. 2021 (Year: 2021).*

(Continued)

*Primary Examiner* — William D Cumming

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The method includes a method performed by a first terminal in a wireless communication system, comprising obtaining resource pool information associated with a side link, transmitting sidelink control information (SCI) associated with sidelink data on a physical sidelink control channel (PSSCH), and transmitting the sidelink data on a physical sidelink shared channel (PSSCH) based on the SCI. Feedback information associated with the sidelink data is received from a second terminal based on a distance between the first terminal and the second terminal, in case that a zone identity (ID) of the first terminal and information on a range requirement are included in the SCI.

16 Claims, 17 Drawing Sheets

(51) Int. Cl.
*H04W 72/04* (2009.01)
*H04L 5/00* (2006.01)
*H04W 4/02* (2018.01)
*H04W 4/40* (2018.01)
*H04W 76/11* (2018.01)
*H04W 92/18* (2009.01)

(52) U.S. Cl.
CPC ............. *H04W 4/40* (2018.02); *H04W 72/02* (2013.01); *H04W 72/0406* (2013.01); *H04W 76/11* (2018.02); *H04W 92/18* (2013.01)

(58) Field of Classification Search
CPC ......... H04W 72/0406; H04W 72/1278; H04W 76/02; H04W 72/1252; H04W 8/24; H04W 36/044; H04W 4/40; H04L 5/0053
USPC ....................................................... 370/329
See application file for complete search history.

(56) References Cited

U.S. PATENT DOCUMENTS

| | | | |
|---|---|---|---|
| 2016/0345312 A1 | 11/2016 | Kim et al. | |
| 2017/0215183 A1 | 7/2017 | Gulati et al. | |
| 2020/0092845 A1* | 3/2020 | Cai | H04W 68/02 |
| 2020/0106566 A1* | 4/2020 | Yeo | H04W 28/04 |
| 2020/0145855 A1* | 5/2020 | Hahn | H04B 7/0617 |
| 2020/0162864 A1* | 5/2020 | Lee | H04W 28/02 |
| 2021/0050954 A1* | 2/2021 | Ryu | H04W 76/14 |
| 2021/0068120 A1* | 3/2021 | Jung | H04W 72/085 |
| 2021/0203453 A1* | 7/2021 | Kim | H04W 72/0406 |
| 2021/0243837 A1* | 8/2021 | Jung | H04W 8/24 |
| 2022/0095186 A1* | 3/2022 | Zhang | H04W 36/0044 |
| 2022/0140976 A1* | 5/2022 | Lin | H04L 5/0053 370/329 |
| 2022/0173855 A1* | 6/2022 | Akoum | H04L 5/0048 |
| 2022/0183028 A1* | 6/2022 | Lee | H04W 72/1252 |
| 2022/0191965 A1* | 6/2022 | Agiwal | H04W 72/0406 |
| 2022/0210747 A1* | 6/2022 | Lee | H04W 4/40 |
| 2022/0224443 A1* | 7/2022 | Lee | H04L 47/11 |
| 2022/0225292 A1* | 7/2022 | Mohammad Soleymani | H04L 1/0038 |
| 2022/0236394 A1* | 7/2022 | Nam | G01S 7/006 |
| 2022/0312457 A1* | 9/2022 | Wang | H04W 72/1263 |

FOREIGN PATENT DOCUMENTS

| | | | | |
|---|---|---|---|---|
| WO | WO-2020088609 A1 | * | 5/2020 | ........... H04L 5/0053 |
| WO | WO-2020197213 A1 | * | 10/2020 | ........ H04W 72/0406 |
| WO | WO-2020222592 A1 | * | 11/2020 | ............ H04W 72/02 |

OTHER PUBLICATIONS

S. -Y. Lien et al., "3GPP NR Sidelink Transmissions Toward 5G V2X," in IEEE Access, vol. 8, pp. 35368-35382, Feb. 2020, doi: 10.1109/ACCESS.2020.2973706. (Year: 2020).*

Qualcomm Incorporated, "Phyical Layer Procedures for Sidelink" Apr. 2019 (Year: 2019).*

M. H. C. Garcia et al., "A Tutorial on 5G NR V2X Communications," in IEEE Communications Surveys & Tutorials, vol. 23, No. 3, pp. 1972-2026, third quarter 2021, doi: 10.1109/COMST.2021. 3057017. (Year: 2021).*

M. Harounabadi, D. M. Soleymani, S. Bhadauria, M. Leyh and E. Roth-Mandutz, "V2X in 3GPP Standardization: NR Sidelink in Release-16 and Beyond," in IEEE Communications Standards Magazine, vol. 5, No. 1, pp. 12-21, Mar. 2021, doi: 10.1109/MCOMSTD.001.2000070. (Year: 2021).*

International Search Report and Written Opinion of the International Searching Authority in connection with International Application No. PCT/KR2020/010859 dated Nov. 6, 2020, 10 pages.

Fujitsu, "Further Study on Tx-Rx Distance based HARQ Feedback," R1-1905378, 3GPP TSG RAN WG1 #96b, Xian, China, Apr. 8-12, 2019, 3 pages.

Supplementary European Search Report dated Feb. 21, 2022, in connection with European Application No. 20852851.3, 10 pages.

Intel Corporation, "Summary#3 for AI 7.2.4.2 2 Mode-2 Resource Allocation," R1-1907888, 3GPP TSG RAN NG1 Meeting #97, Reno, USA, May 13-17, 2019, 28 pages.

Qualcomm Incorporated, "PC5 QoS parameters clarifications," S2-1908216 (revision of S2-1908194 was S2-1907197), SA WG2 Meeting #134, Sapporo, Japan, Jun. 24-28, 2019, 3 pages.

* cited by examiner

FIG. 13
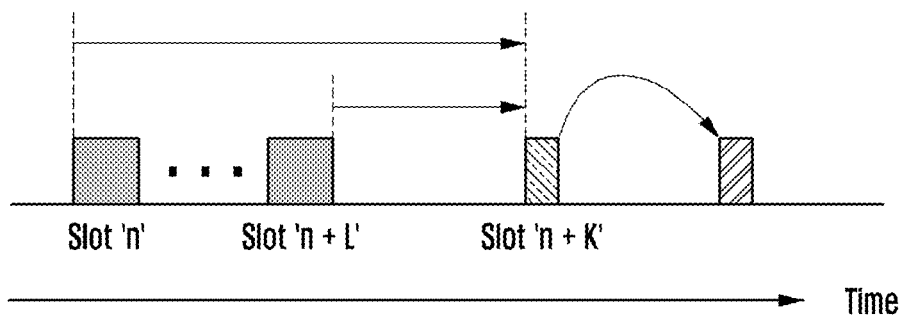
(a)
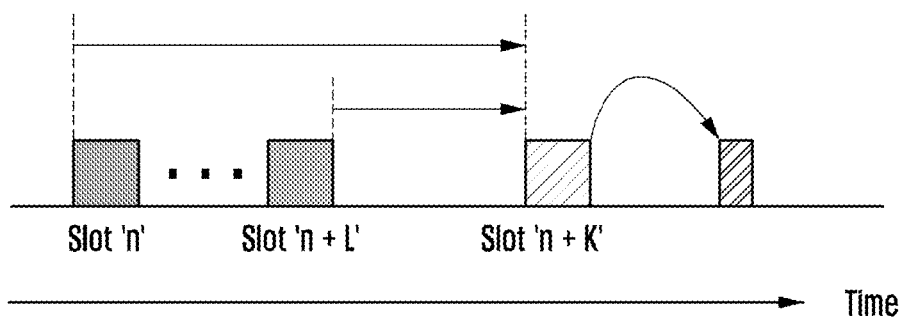
(b)

METHOD AND DEVICE FOR PROVIDING HARQ FEEDBACK IN WIRELESS COMMUNICATION SYSTEM

CROSS-REFERENCE TO RELATED APPLICATION

This application is based on and claims priority under 35 U.S.C. 119 to Korean Patent Application No. 10-2019-0099807 filed on Aug. 14, 2019 in the Korean Intellectual Property Office, the disclosure of which is herein incorporated by reference in its entirety.

BACKGROUND

1. Field

The disclosure relates to a method and a device for feedback transmission/reception in a wireless communication system. The disclosure relates to a method and a device for providing feedback in a sidelink system, such as a device-to-device (D2D) system or a vehicle-to-everything (V2X) system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology. Vehicle-to-everything (hereinafter, V2X) using a 5G communication system is being studied, and it is expected that various services can be provided to users using V2X.

The information is presented as background information only, and is provided to aid the understanding of the disclosure. No decision has been made and no claims have been made as to whether any of the above can be applied as prior art in connection with the disclosure.

SUMMARY

A technical task to be achieved in embodiments of the disclosure is to provide a method and a device for transmitting or receiving feedback between sidelinks in order to support high reliability and a high data rate.

A technical task to be achieved in embodiments of the disclosure is to provide a method and device for providing feedback in a next generation mobile communication system, such as D2D or V2X.

A technical task to be achieved in embodiments of the disclosure is to provide a method and device capable of effectively providing a service in a mobile communication system.

An embodiment may provide a method performed by a first terminal in a wireless communication system, the method comprising: obtaining resource pool information associated with a side link; transmitting sidelink control information (SCI) associated with sidelink data on a physical sidelink control channel (PSSCH); and transmitting the sidelink data on a physical sidelink shared channel (PSSCH) based on the SCI, wherein feedback information associated with the sidelink data is received from a second terminal based on a distance between the first terminal and the second terminal, in case that a zone identity (ID) of the first terminal and information on a range requirement are included in the SCI.

In addition, an embodiment may provide a method performed by a second terminal in a wireless communication system, the method comprising: obtaining resource pool information associated with a side link; receiving, from a first terminal, sidelink control information (SCI) associated with sidelink data on a physical sidelink control channel (PSSCH); and receiving, from the first terminal, the sidelink data on a physical sidelink shared channel (PSSCH) based on the SCI, wherein feedback information associated with the sidelink data is transmitted to the first terminal based on a distance between the first terminal and the second terminal, in case that a zone identity (ID) of the first terminal and information on a range requirement are included in the SCI.

In addition, an embodiment may provide a first terminal in a wireless communication system, the first terminal comprising: a transceiver; and a controller configured to: obtain resource pool information associated with a side link, to transmit, via the transceiver, sidelink control information (SCI) associated with sidelink data on a physical sidelink control channel (PSSCH), and to transmit, via the transceiver, the sidelink data on a physical sidelink shared channel (PSSCH) based on the SCI, wherein feedback information associated with the sidelink data is received from a second terminal based on a distance between the first terminal and the second terminal, in case that a zone identity (ID) of the first terminal and information on a range requirement are included in the SCI.

In addition, an embodiment may provide a second terminal in a wireless communication system, the second terminal comprising: a transceiver; and a controller configured to: obtain resource pool information associated with a side link, to receive, from a first terminal via the transceiver, sidelink control information (SCI) associated with sidelink data on a physical sidelink control channel (PSSCH), and to receive, from the first terminal via the transceiver, the sidelink data on a physical sidelink shared channel (PSSCH) based on the SCI, wherein feedback information associated with the sidelink data is transmitted to the first terminal based on a distance between the first terminal and the second terminal, in case that a zone identity (ID) of the first terminal and information on a range requirement are included in the SCI.

According to an embodiment of the disclosure, an improved communication method and device can be provided in a communication system. According to an embodiment of the disclosure, an improved feedback transmission/reception method and device can be provided in a communication system. According to an embodiment of the disclosure, an improved feedback method and device can be provided in a next-generation mobile communication system, such as D2D or V2X.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 shows another embodiment for transmission of location information of a transmission UE according to an embodiment of the disclosure;

DETAILED DESCRIPTION

Figure 1:
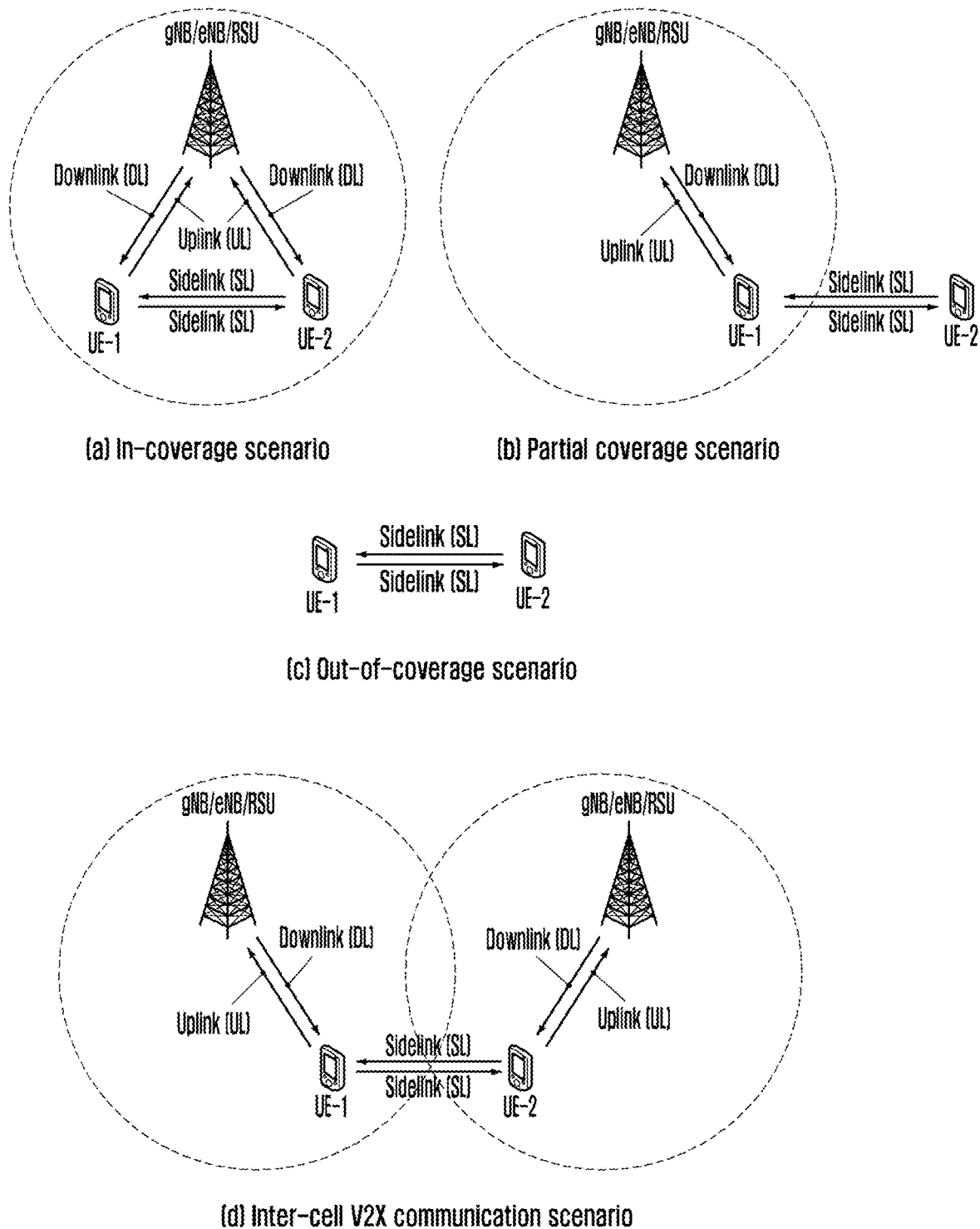
FIG. 1 shows an example for a system for describing an embodiment of the disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. To fully disclose the scope of the present disclosure to those skilled in the art, and the present disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 5G, new radio (NR), or LTE system standards for the convenience of description. However, the disclosure is not limited by these terms and names, and may be applied in the same way to systems that conform other standards.

That is, communication standards defined by the 3GPP will be mainly described in the detailed description of embodiments of the disclosure, but based on determinations by those skilled in the art, the main idea of the disclosure may be applied to other communication systems having similar backgrounds through some modifications without significantly departing from the scope of the disclosure.

In the disclosure, a transmission UE refers to a UE that transmits sidelink control information and data information, and refers to a UE that receives HARQ feedback information. A reception UE refers to a UE that receives sidelink control information and data information. The reception UE refers to a UE that receives location information of a transmission UE and calculates a distance between the transmission UE and itself (the reception UE) according to the received location information, thereby determining whether to transmit HARQ feedback. The reception UE refers to a UE that transmits HARQ feedback information on the basis of the determination. In the disclosure, a transmission UE may be used in combination with a D2D transmission UE and a V2X transmission UE, and a reception UE may be used as a D2D reception UE and a V2X reception UE. In the disclosure, a transmission UE and a reception UE are terms used to distinguish a UE transmitting data and a UE receiving data, and a UE is not always limited to a transmission UE or a reception UE in the disclosure. When a specific UE serves to transmit sidelink control information and data information, the specific UE may operate as the transmission UE described in the disclosure, and when the specific UE serves to receive sidelink control information and data, the specific UE may operate as the reception UE described in the disclosure. When a specific UE serves to transmit sidelink HARQ feedback information, the specific UE may operate as the transmission UE described in the disclosure, and when the specific UE serves to receive sidelink HARQ feedback information, the specific UE operates as the reception UE described in the disclosure.

FIG. 1 shows an example for a system for describing an embodiment of the disclosure.

FIG. 1 (A) shows an example of a case (In-coverage scenario) in which all V2X UEs UE-1 and UE-2 are located within the coverage of a base station (gNB/evolved node B (eNB)/roadside unit (RSU)). All V2X UEs UE-1 and UE-2 may receive data and control information via a downlink (DL) from the base station (gNB/eNB/RSU) or may transmit data and control information via an uplink (UL) to the base station. The data and the control information may be data and control information for V2X communication or may be data and control information for general cellular communication that is not V2X communication. In (A) of FIG. 1, the V2X UEs UE-1 and UE-2 may transmit or receive data and control information for V2X communication via a sidelink (SL).

(B) of FIG. 1 shows an example of a case (partial coverage) in which UE-1 among V2X UEs is located within the coverage of a base station (gNB/eNB/RSU) and UE-2 is located outside the coverage of the base station (gNB/eNB/RSU). UE-1 located in the coverage of the base station may receive data and control information from the base station via a DL (DL) or may transmit data and control information via a UL (UL) to the base station. UE-2 located outside the coverage of the base station may not receive data and control information via the downlink from the base station, and may not transmit data and control information via the uplink to the base station. UE-2 may transmit or receive data and control information for V2X communication via UE-1 and a side link (SL).

(C) of FIG. 1 shows an example of a case in which all V2X UEs UE-1 and UE2 are located outside the coverage of a base station (gNB/eNB/RSU). Therefore, UE-1 and UE-2 may not receive data and control information from the base station via the DL and may not transmit data and control information via UL to the base station. UE-1 and UE-2 may transmit/receive data and control information for V2X communication via the side link (SL).

(D) of FIG. 1 shows an example of a case (a radio resource control (RRC) connected state) in which a V2X transmission UE and a V2X reception UE are connected to different base stations (gNB/eNB/RSU) or a case (an RRC disconnected state, i.e., an RRC idle state) (Inter-cell V2X communication) in which the V2X transmission UE and the V2X reception UE are camped. UE-1 may be a V2X transmission UE and UE-2 may be a V2X reception UE. Alternatively, UE-1 may be a V2X reception UE and UE-2 may be a V2X transmission UE. UE-1 may receive a V2X dedicated system information block (SIB) from a base station to which UE-1 is connected (or on which UE-1 is camping), and UE-2 may receive a V2X dedicated SIB from another base station to which UE-2 is connected (or on which UE-2 is camping). Information of the V2X dedicated SIB, which is received by UE-1, and information of the V2X dedicated SIB, which is received by UE-2, may be different from each other. Therefore, in order to perform D2D V2X communication located in different cells, it is necessary to unify information.

In FIG. 1, for the convenience of description, a V2X system including two UEs (UE-1 and UE-2) is described as an example. However, a V2X system is not limited thereto, and various numbers of UEs may participate in the V2X system. The uplink (UL) and downlink (DL) between the base station (eNB/gNB/RSU) and the V2X UEs UE-1 and UE-2 may be referred to as a Uu interface, and the sidelink SL between the V2X UEs UE-1 and UE-2 may be referred to as a PC5 interface. Therefore, in the disclosure, it is stated in advance that such terms may be used interchangeably.

In the disclosure, a UE may refer to a UE supporting sidelink communication, a UE supporting device-to-device (D2D) communication, a vehicle supporting vehicular-to-vehicular (V2V) communication, a vehicle or a handset (e.g., a smartphone) of a pedestrian, which supports vehicular-to-pedestrian (V2P) communication, a vehicle supporting vehicular-to-network (V2N) communication, or a vehicle supporting vehicular-to-infrastructure (V2I) communication. In the disclosure, a UE may refer to an RSU equipped with a UE function, an RSU equipped with a base station function, or an RSU equipped with a part of the base station function and a part of the UE function.

Figure 2:
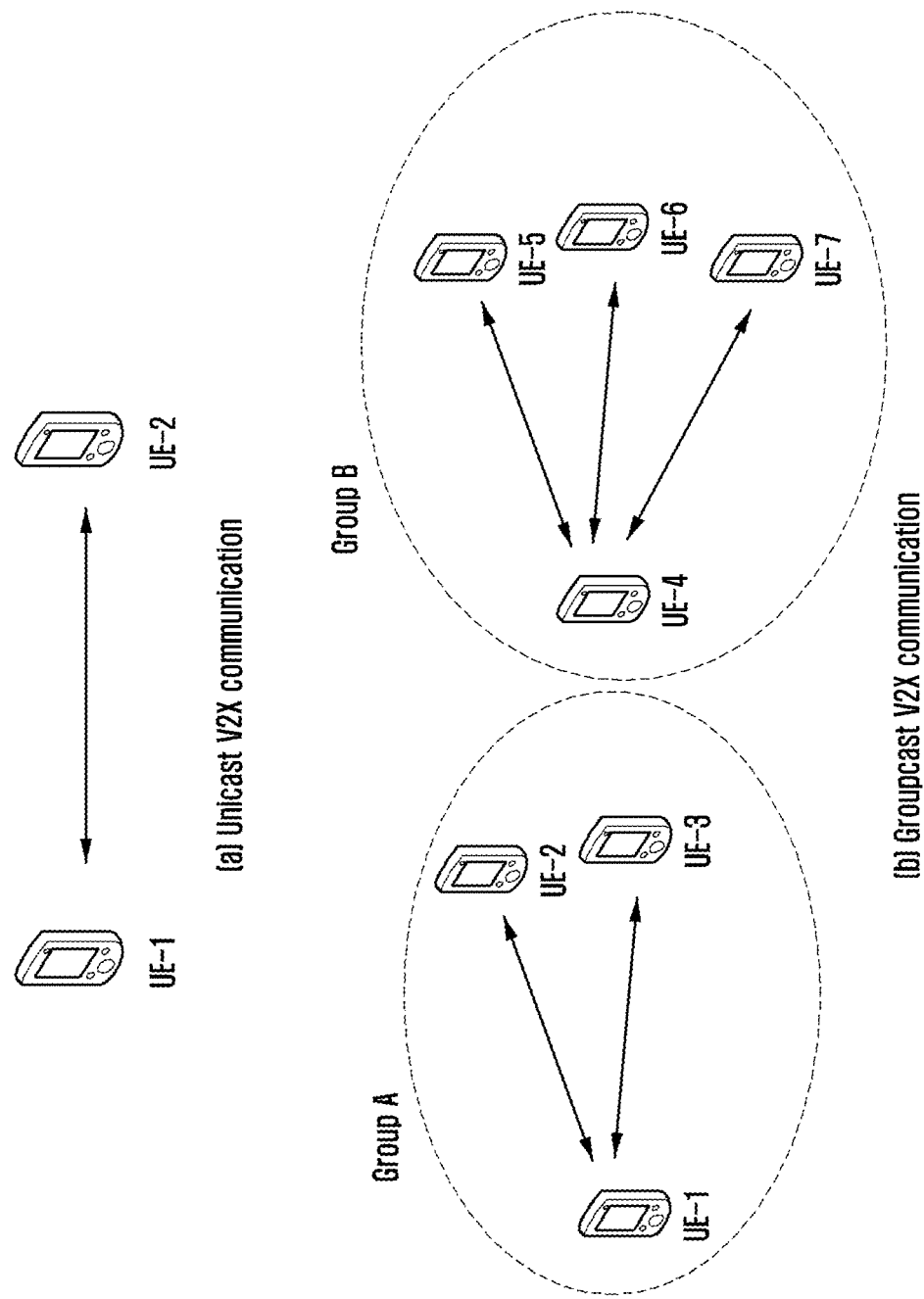
FIG. 2 shows an example for a sidelink communication method for describing an embodiment of the disclosure.

FIG. 2 shows an example for a sidelink communication method for describing an embodiment of the disclosure.

As shown in (A) of FIG. 2, a transmission UE and a reception UE may perform one-to-one communication, and this may be referred to as unicast communication.

As transmission in (B) of FIG. 2, a transmission UE and a reception UE may perform one-to-many communication, and this may be called groupcast or multicast. (B) of FIG. 2 illustrates that UE-1, UE-2, and UE-3 form one group (group A) to perform groupcast communication, and illustrates that UE-4, UE-5, UE-6, and UE-7 form another group (group B) to perform groupcast communication. Each UE may perform groupcast communication only within a group to which each UE belongs, and may perform unicast, groupcast, or broadcast communication between different groups. FIG. 2B illustrates that two groups are formed, but is not limited thereto, and a larger number of groups may be formed.

Although not illustrated in FIG. 2, sidelink UEs may perform broadcast communication. The broadcast communication refers to a case where all sidelink UEs (e.g., a plurality of UEs in a range that enables sidelink communication) receive data and control information transmitted by a sidelink transmission UE via a sidelink. For example, UE-1 in (B) of FIG. 2, if it is assumed that UE-1 is a transmission UE for broadcast, all UEs (UE-2, UE-3, UE-4, UE-5, UE-6, and UE-7) may receive data and control information transmitted by UE-1.

A sidelink unicast, groupcast, and broadcast communication method according to an embodiment may be supported in in-coverage, partial-coverage, and out-of-coverage scenarios.

In NR sidelink communication, unlike in LTE sidelink communication, support of a transmission type in which a vehicle UE transmits data to only one specific UE via unicast and support of a transmission type in which data is transmitted to a specific number of UEs via groupcast may be considered. For example, when considering a service scenario, such as platooning, which is a technology of moving two or more vehicles in a cluster by connecting the two or more vehicles with one network, such unicast and groupcast technologies may be useful. Specifically, unicast communication may be required for the purpose of controlling a specific UE by a leader UE of a group connected by platooning, and groupcast communication may be required for the purpose of simultaneously controlling a specific number of UEs.

In the NR sidelink system, resource allocation may be performed as follows.

(1) Mode 1 Resource Allocation

Mode 1 resource allocation refers to a method of resource allocation scheduled by a base station (scheduled resource allocation). More specifically, in mode 1 resource allocation, the base station may allocate resources used for sidelink transmission to RRC connected UEs in a dedicated scheduling method. The base station is able to manage resources of the sidelink, so that the scheduled resource allocation method may be effective for interference management and resource pool management (dynamic allocation and/or semi-persistent transmission). If there is data to be transmitted to other UE(s), the RRC connected mode UE may transmit, to the base station, information indicating that there is the data to be transmitted to other UEs, by using an RRC message or a medium access control (MAC) control element (CE). For example, the RRC message may be a sidelink UE information (SidelinkUEInformation) message or a UE assistance information (UEAssistanceInformation) message. The MAC CE may correspond to a scheduling request (SR) and a buffer status report (BSR) MAC CE including at least one of information on the size of data buffered for sidelink communication and an indicator for notification of a BSR for V2X communication. The sidelink transmission UE receives resources scheduled by the base station, and therefore a method of the mode 1 resource allocation may be applied when a V2X transmission UE is within the coverage of the base station.

(2) Mode 2 Resource Allocation

In mode 2, a sidelink transmission UE may autonomously select a resource (UE autonomous resource selection). More specifically, mode 2 corresponds to a method of providing, by the base station, the UE with a sidelink transmission/reception resource pool for sidelink, as system information or an RRC message (e.g., an RRC reconfiguration message or a PC5-RRC message), wherein the transmission UE having received the transmission/reception resource pool selects a resource pool and a resource according to a predetermined rule. In the above example, the base station provides configuration information for the sidelink transmission/reception resource pool, and mode 2 may be applied when the sidelink transmission UE and a reception UE are in the coverage of the base station. If the sidelink transmission UE and the reception UE exist outside the coverage of the base station, the sidelink transmission UE and the reception UE may perform a mode 2 operation in a preconfigured transmission/reception resource pool. A UE autonomous resource selection method may include zone mapping, sensing-based resource selection, random selection, etc.

(3) Additionally, even if a UE is in the coverage of the base station, resource allocation or resource selection may not be performed in the scheduled resource allocation or UE autonomous resource selection mode, and in that case, the UE may perform sidelink communication via a preconfigured sidelink transmission/reception resource pool (preconfiguration resource pool).

The sidelink resource allocation method according to the above embodiment of the disclosure may be applied to various embodiments of the disclosure.

Figure 3:
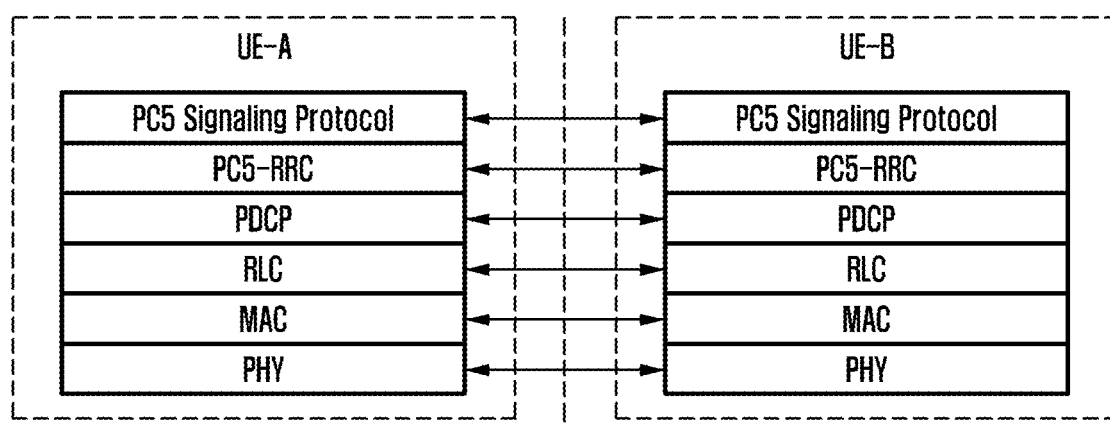
FIG. 3 shows an embodiment for a protocol of a sidelink UE to which an embodiment of the disclosure is applied.

FIG. 3 shows an embodiment for a protocol of a sidelink UE to which an embodiment of the disclosure is applied.

Although not illustrated in FIG. 3, application layers of UE-A and UE-B may perform service discovery. The service discovery may include discovery of a V2X communication scheme (unicast, groupcast, or broadcast) that will be performed by each UE. Therefore, in FIG. 3, it may be assumed that UE-A and UE-B have recognized to perform a unicast communication scheme via a service discovery procedure performed in the application layers. More specifically, in the application layers, operations related to group management, a group ID, a quality of service (QoS), etc. may be performed. Although not illustrated in FIG. 3, a V2X layer may convert a group ID received from the application layer to a destination layer-2 ID (destination L2 ID) and may assign its own transmitter layer-2 ID (source L2 ID). If the V2X layer fails to receive the group ID from the application layer, the V2X layer may determine the destination L2 ID according to default mapping. The V2X layer generates tag information to distinguish groupcast and broadcast traffic, and may include the tag information in a protocol data unit (PDU) or a service data unit (SDU) of the V2X layer. The V2X layer may acquire information on a transmitter L2 ID (source identifier) and a destination L2 ID (destination identifier) for V2X communication by V2X UEs, by transferring the above-described information to an access stratum (AS) layer.

When the above-described procedure is completed, the PC5 signaling protocol layer illustrated in FIG. 3 may perform a D2D direct link connection setup procedure. At this time, security configuration information for D2D direct communication may be exchanged.

When the D2D direct link connection setup is completed, a D2D PC5 radio resource control (RRC) configuration procedure may be performed in the PC5 RRC layer of FIG. 3. Information on the capabilities of UE-A and UE-B may be exchanged, and AS layer parameter information for unicast communication may be exchanged.

When the PC5 RRC configuration procedure is completed, UE-A and UE-B may perform unicast communication.

In the above example, unicast communication is described as an example, but it may be extended to groupcast communication. For example, when UE-A, UE-B, and UE-C that is not illustrated in FIG. 3 perform groupcast communication, as mentioned above, UE-A and UE-B may perform D2D direct link setup, PC5 RRC configuration procedures, and service discovery for unicast communication. Further, UE-A and UE-C may also perform D2D direct link setup, PC5 RRC setup procedures, and service discovery for unicast communication. UE-B and UE-C may perform D2D direct link setup, PC5 RRC setup procedures, and service discovery for unicast communication. That is, rather than performing a separate PC5 RRC configuration procedure for groupcast communication, a PC5 RRC configuration procedure for unicast communication may be performed by each pair of a transmission UE and a reception UE participating in groupcast communication. However, a PC5 RRC configuration procedure for unicast communication is not always required to be performed in a groupcast method. For example, there may be a scenario of groupcast communication performed without PC5 RRC connection establishment, and in this case, a PC5 connection establishment procedure for unicast transmission may be omitted.

Figure 4:
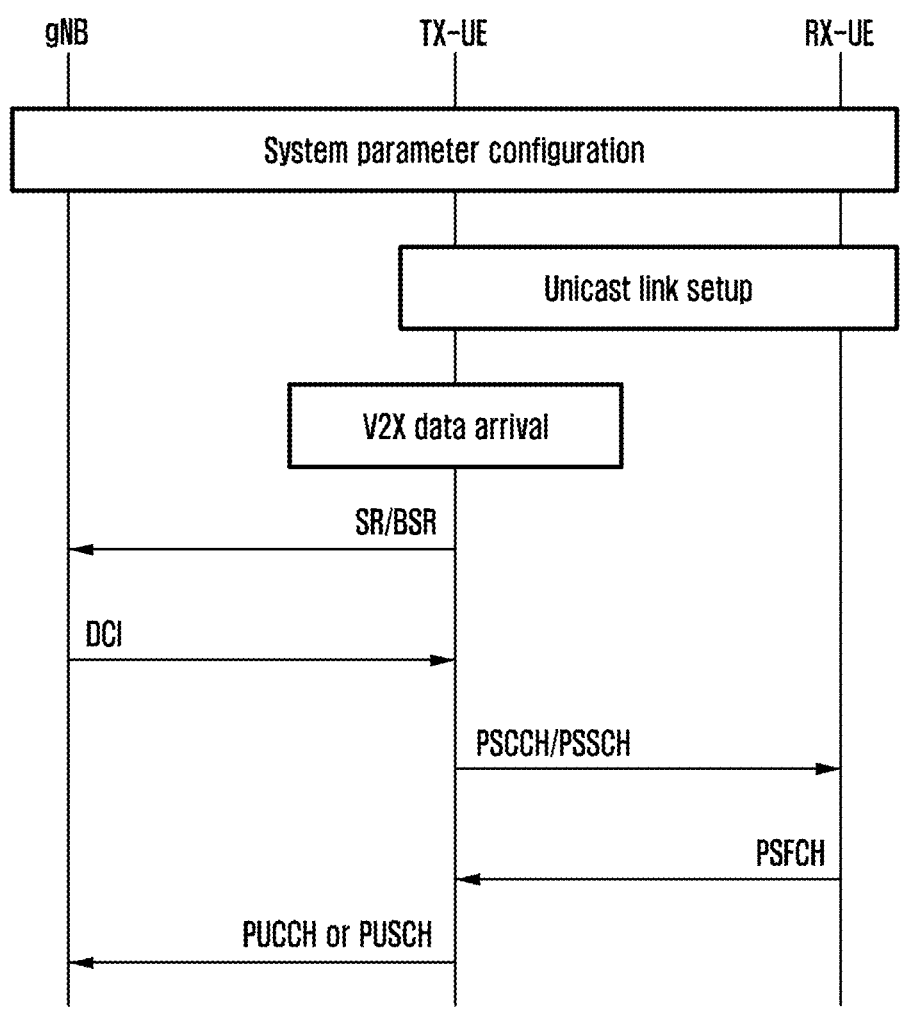
FIG. 4 shows an example for a sidelink communication procedure according to an embodiment of the disclosure.

FIG. 4 shows an example for a sidelink communication procedure according to an embodiment of the disclosure.

More specifically, FIG. 4 illustrates a sidelink communication procedure based on mode 1 resource allocation described in FIG. 2. In FIG. 4, a base station (eNB/gNB/RSU) may transmit a parameter for sidelink communication via system information to a transmission UE and a reception UE in a cell. A parameter for sidelink communication may be configured in the UE having received the system information. For example, the base station may configure information on a resource pool in which V2X communication may be performed in its own cell. The resource pool may refer to a transmission resource pool for V2X transmission or may refer to a reception resource pool for V2X reception. A V2X UE may receive information on one or more resource pools from the base station and may configure same. The base station may configure unicast, groupcast, and broadcast communication to be performed in different resource pools, via system information. For example, resource pool 1 may be used for unicast communication, resource pool 2 may be used for groupcast, and resource pool 3 may be used for broadcast communication. As another example, the base station may perform configuration so that unicast, groupcast, and broadcast communication can be performed in the same resource pool. As another example, different resource pools may be configured according to whether a resource of a physical sidelink feedback channel (PSFCH) for transmitting sidelink feedback information exists in the resource pool. More specifically, resource pool 1 may be a pool in which a PSFCH resource exists, and resource pool 2 may be a pool in which no PSFCH resource exists. Groupcast data and sidelink unicast requiring hybrid automatic repeat and request (HARQ) feedback may use resource pool 1, and groupcast data, broadcast data, and sidelink unicast requiring no HARQ feedback may use resource pool 2.

At least one piece of following information may be included in resource pool information configured by the base station.

1. Information on time resources in a resource pool: Specifically, the information may include a slot index, in which a physical sidelink control channel (PSCCH), a physical sidelink shared channel (PSSCH), and a physical sidelink feedback channel (PSFCH) are transmitted, or may include the slot index, in which PSCCH, PSSCH and PSFCH are transmitted, and a symbol index in the corresponding slot may be included. In addition, periods of resources at which PSCCH, PSSCH and PSFCH are transmitted may be included. (At least one piece of the above information may be included.)

2. Information on frequency resources of a resource pool: The information refers to information on a frequency axis in a resource pool on which PSCCH, PSSCH, and PSSCH may be transmitted, and may specifically include a resource block index constituting the resource pool or an index of a sub-channel including two or more resource blocks. (At least one piece of the above information may be included.)

3. Information on whether sidelink HARQ-ACK is operated may be included in the resource pool configuration information.

(1) At least one piece of following information may be included for a case where sidelink HARQ-ACK is operated.

(1-1) Maximum number of retransmissions (1-2) HARQ-ACK timing: The HARQ-ACK timing refers to a point in time from when a V2X reception UE receives sidelink control information and data information from a V2X transmission UE, to when the V2X reception UE transmits related HARQ-ACK/NACK information to the V2X transmission UE. A unit of time may be a slot or one or more OFDM symbols.

(1-3) A PSFCH format or HARQ feedback method: When two or more PSFCH formats are operated, one PSFCH format may be used to transmit HARQ-ACK/NACK information composed of 1 bit or 2 bits. Another PSFCH format may be used to transmit HARQ-ACK/NACK information composed of 3 bits or more. If the aforementioned HARQ-ACK/NACK information is transmitted via PSFCH, each of ACK information and NACK information may be transmitted via PSFCH. The V2X reception UE may transmit ACK via PSFCH when decoding of PSSCH transmitted from the V2X transmission UE is been successful. When the decoding fails, NACK may be transmitted via the PSFCH. As another example, the V2X reception UE does not transmit ACK when decoding of PSSCH transmitted from the V2X transmission UE is successful, and may transmit NACK via PSFCH only when the decoding fails. Alternatively, when one PSFCH format is operated, information on the aforementioned HARQ feedback method (whether each of ACK information and NACK information will be transmitted via PSFCH or only NACK information will be transmitted via PSFCH) may be included.

(1-4) Time/frequency/code resource or resource set constituting PSFCH: In a case of a time resource, a slot index, in which PSFCH is transmitted, may be included, or the symbol index and a period may be included. In a case of a frequency resource, a frequency block (RB: resource block) via which PSFCH is transmitted, or a start point and an end point of a sub-channel including two or more consecutive blocks (or a start point and a length of a frequency resource) may be included.

(2) If sidelink HARQ-ACK is not operated, the above-described information may be excluded from resource pool configuration information.

4. Information on whether blind retransmission is operated may be included in resource pool configuration information.

(1) Unlike HARQ-ACK/NACK-based retransmission, blind retransmission may mean that a transmission UE repeatedly performs transmission without receiving feedback information for ACK or NACK from a reception UE. If blind retransmission is operated, the number of blind retransmissions may be included in resource pool information. For example, if the number of blind retransmissions is configured to 4, the transmission UE may always transmit the same information 4 times when transmitting PSCCH/PSSCH to the reception UE. A redundancy version (RV) value may be included in sidelink control information (SCI) transmitted via PSCCH. If blind retransmission is not operated, the above-described information may be excluded from the resource pool configuration information.

5. The resource pool configuration information may include information on a demodulation reference signal (DMRS) pattern that may be used in PSSCH transmitted from a corresponding resource pool.

(1) The DMRS pattern that may be used in PSSCH may be different according to a speed of a UE. For example, if the speed is high, it is necessary to increase the number of OFDM symbols used for DMRS transmission in a time axis in order to improve accuracy of channel estimation. If the speed of UE is low, even if a small number of DMRS symbols are used, the accuracy of channel estimation can be guaranteed, so that it is necessary to reduce the number of OFDM symbols used for DMRS transmission in the time axis in order to reduce a DMRS overhead. Therefore, the information on the resource pool may include information on the DMRS pattern that may be used in the corresponding resource pool. Two or more DMRS patterns are configured in one resource pool, and the V2X transmission UE may select and use one DMRS pattern from among the DMRS patterns configured according to the speed of the V2X transmission UE. The V2X transmission UE may transmit information on the DMRS pattern selected thereby to the V2X reception UE via SCI of PSCCH. The V2X reception UE may receive the information to obtain DMRS pattern information, may perform channel estimation for PSSCH, and may obtain sidelink data information via demodulation and decoding procedures.

6. Information on whether a sidelink channel state information reference signal (CSI-RS) is operated may be included in the resource pool configuration information.

(1) At least one piece of following information may be included if the sidelink CSI-RS is operated.

(1-1) A CSI-RS transmission start time: A CSI-RS transmission start time may refer to a start time at which the V2X transmission UE should transmit the CSI-RS to the V2X reception UE. The start time may refer to an index of a slot in which the CSI-RS is transmitted, or may refer to an index of a symbol at which the CSI-RS is transmitted, or both the indices of the slot and symbol.

(1-2) CSI reporting (CSI reporting) timing: CSI reporting timing refers to time from a point in time when the V2X reception UE receives the CSI-RS from the V2X transmission UE (i.e., a slot index, in which the CSI-RS is received, or a symbol index in the slot for the reception), to a point in time when the V2X reception UE transmits a CSI report to the V2X transmission UE (i.e., a slot index in which the CSI report is transmitted, or a symbol index in the slot index for the transmission). A unit representing time may be a slot or one or more OFDM symbols.

(2) If the sidelink CSI-RS is not operated, the information may be excluded from the resource pool configuration information.

7. Parameters for controlling sidelink transmission power may be included in the resource pool configuration information. (At least one of following parameters)

(1) A sidelink path attenuation estimation value may be required for sidelink transmission power control. If a Uu carrier and a sidelink carrier of the base station are the same, in order to reduce interference caused by sidelink transmission to an uplink signal received at a base station reception end, the sidelink transmission power control may be operated based on a downlink path attenuation estimation value. To this end, the base station may configure whether the V2X transmission UE should configure a sidelink transmission power value on the basis of the sidelink path attenuation estimation value, whether the V2X transmission UE should configure the sidelink transmission power value on the basis of the downlink path attenuation estimation value, or whether the V2X transmission UE should configure the sidelink transmission power value by considering both the sidelink path attenuation estimation value and the downlink path attenuation estimation value. For example, if the base station configures an SSB or a downlink CSI-RS as a signal to be used for path attenuation estimation, the UE may configure a sidelink transmission power value on the basis of a downlink path attenuation value. If the base station configures a sidelink demodulation reference signal (DMRS) or a sidelink CSI-RS as a signal to be used for path attenuation estimation, the UE may configure the sidelink transmission power value on the basis of a sidelink path attenuation value.

(2) As mentioned above, different transmission power parameters may be configured depending on a signal used for path attenuation estimation.

Although the above-mentioned information is illustrated to be included in resource pool configuration for V2X communication, the disclosure is not limited thereto. That is, the above-mentioned information may be configured, independently of the resource pool configuration, by the V2X transmission UE or the V2X reception UE.

As illustrated in FIG. 4, when data to be transmitted from the V2X transmission UE to the V2X reception UE is generated, the V2X transmission UE may request, from the base station, a sidelink resource for transmission of the data to the V2X reception UE, by using a scheduling request (SR) or/and a buffer status report (BSR). The base station that has received the SR or/and BSR may confirm that the V2X transmission UE has data for sidelink transmission, and may determine resources required for sidelink transmission on the basis of the SR or/and BSR.

The base station transmits a sidelink scheduling grant to the V2X transmission UE, the sidelink scheduling grant including at least one of resource information for sidelink control information (SCI) transmission, resource information for sidelink data transmission, and resource information for sidelink feedback transmission. The sidelink scheduling grant is information for granting dynamic scheduling in the sidelink, and may be downlink control information (DCI) transmitted on a physical downlink control channel (PDCCH). If the base station is an NR base station, the sidelink scheduling grant may include information indicating a bandwidth part (BWP) in which sidelink transmission is performed, and a carrier frequency indicator or a carrier indicator field (CIF) in which sidelink transmission is performed. If the base station is an LTE base station, only the CIF may be included. The sidelink scheduling grant may further include feedback information for the sidelink data, that is, resource allocation-related information of PSFCH transmitting ACK/NACK information. The resource allocation information may include information for allocation of a plurality of PSFCH resources for a plurality of UEs in a group when the sidelink transmission is groupcast. The resource allocation-related information of feedback information may be information indicating at least one of multiple sets of feedback information resource candidates configured via higher layer signaling.

The V2X transmission UE having received the sidelink scheduling grant transmits SCI for scheduling sidelink data according to the sidelink scheduling grant, to the V2X reception UE on the physical sidelink control channel (PSCCH), and transmits sidelink data scheduled by the SCI to the V2X reception UE on the physical sidelink shared channel (PSSCH). The SCI may include at least one of resource allocation information used for sidelink data transmission, modulation and coding scheme (MCS) information applied to sidelink data, group destination ID information, transmitter ID (source ID) information, unicast destination ID information, power control information for controlling sidelink power, timing advance (TA) information, DMRS configuration information for sidelink transmission, packet repetitive transmission-related information, for example, information on the number of packet repetitive transmissions, resource allocation-related information when performing packet repetitive transmission, a redundancy version (RV), and an HARQ process ID. The SCI may further include feedback information for sidelink data, that is, information indicating a resource via which ACK/NACK information is transmitted.

The V2X reception UE having received the SCI receives sidelink data on the basis of information included in the SCI. Thereafter, the V2X reception UE transmits ACK/NACK information indicating whether decoding of the sidelink data is successful or failed, to the V2X transmission UE on the physical sidelink feedback channel (PSFCH). Feedback information transmission for the sidelink may be applied to unicast transmission or groupcast transmission, but does not exclude a case of broadcast transmission. If the sidelink transmission corresponds to groupcast transmission, each UE having received groupcast data may transmit feedback information by using different PSFCH resources. Alternatively, each UE having received groupcast data may transmit feedback information by using the same PSFCH resource, and at this time, only NACK information may be fed back. That is, the UE having received the data does not perform feedback in a case of ACK, and may perform feedback only in a case of NACK. A PSFCH resource may include not only a resource classified in a time or/and frequency domain, but also a resource classified using a code, such as a scrambling code and an orthogonal cover code, and a resource classified using different sequences and a cyclic shift applied to the different sequences.

The base station may configure the V2X transmission UE to report HARQ feedback received from the V2X reception UE, on the basis of system information or RRC. In this case, the V2X transmission UE may transmit the sidelink HARQ feedback received from the V2X reception UE to the base station via the physical uplink control channel (PUCCH) or the physical uplink shared channel (PUSCH). The base station may configure whether the V2X transmission UE is able to multiplex and transmit the sidelink HARQ feedback information received from the V2X reception UE and uplink control information (UCI) for the existing Uu.

If the base station does not configure to multiplex the sidelink HARQ feedback information and UCI information, the V2X transmission UE is unable to multiplex the sidelink HARQ feedback information and uplink control information (UCI) information for the Uu and to transmit the multiplexed information to one PUCCH. In this case, the base station may independently configure a PUCCH for transmitting the sidelink HARQ feedback information and a PUCCH for transmitting the UCI information. That is, the PUCCH via which the sidelink HARQ feedback information is transmitted independently exists, and no UCI information may be transmitted in the corresponding PUCCH.

Alternatively, when the base station configures multiplexing of the sidelink HARQ feedback information and the UCI information, the V2X transmission UE may multiplex the sidelink HARQ feedback information and the UCI information so as to transmit the multiplexed information via one PUCCH. When the sidelink HARQ feedback information is assumed to be N1 bits and the UCI information is assumed to be N2 bits, a multiplexing order may follow N2+N1 (i.e., the sidelink HARQ feedback information is multiplexed after the UCI information). If a code rate for the sum of the sidelink HARQ feedback bits and the UCI bits, which are multiplexed and transmitted via the PUCCH, is greater than a coding rate configured by the base station, the V2X transmission UE may give up transmission of the sidelink HARQ feedback information (i.e., dropping the sidelink HARQ feedback information). If the V2X transmission UE gives up transmission of the sidelink HARQ feedback information, the sidelink HARQ feedback information may be transmitted on another PUCCH resource or may be multiplexed with other UCI bits and transmitted on another PUCCH resource.

In FIG. 4, a scenario, in which the V2X transmission UE has established an uplink connection to the base station (i.e., an RRC connection state), and both the V2X transmission UE and the V2X reception UE exist in the coverage of the base station, is assumed. Although not illustrated in FIG. 4, if the V2X transmission UE has not established an uplink connection to the base station (i.e., an RRC standby (idle) state), the V2X transmission UE may perform a random access procedure to establish an uplink connection to the base station. Although not illustrated in FIG. 4, in a scenario in which the V2X transmission UE is in the coverage of the base station, and the V2X reception UE is outside the coverage of the base station, the V2X reception UE may receive and use the above-mentioned information for V2X communication in advance. As illustrated in FIG. 4, for the V2X transmission UE, information for V2X communication may be configured by the base station. If both the V2X transmission UE and the V2X reception UE exist outside the coverage of the base station, the V2X transmission UE and the V2X reception UE may receive and use the aforementioned information for V2X communication in advance. Here, the meaning of being configured in advance may be interpreted as using a value embedded in a UE when the UE is shipped. Another meaning of being configured in advance may be interpreted as using a preconfigured value according to information configured by the UE at a specific time. Still another meaning of being configured in advance may refer to using information for V2X communication, which has been acquired in advance via an RRC configuration by accessing the base station by the V2X transmission UE or the V2X reception UE, or using most recently acquired information when information for the V2X communication has been acquired via system information of the base station.

Although not illustrated in FIG. 4, it may be assumed that, before the V2X transmission UE transmits SR/BSR to the base station, service discovery with the V2X reception UE, a procedure of D2D direct link connection setup, and a PC5 RRC configuration procedure have been completed via the procedures mentioned in FIG. 3.

Figure 5:
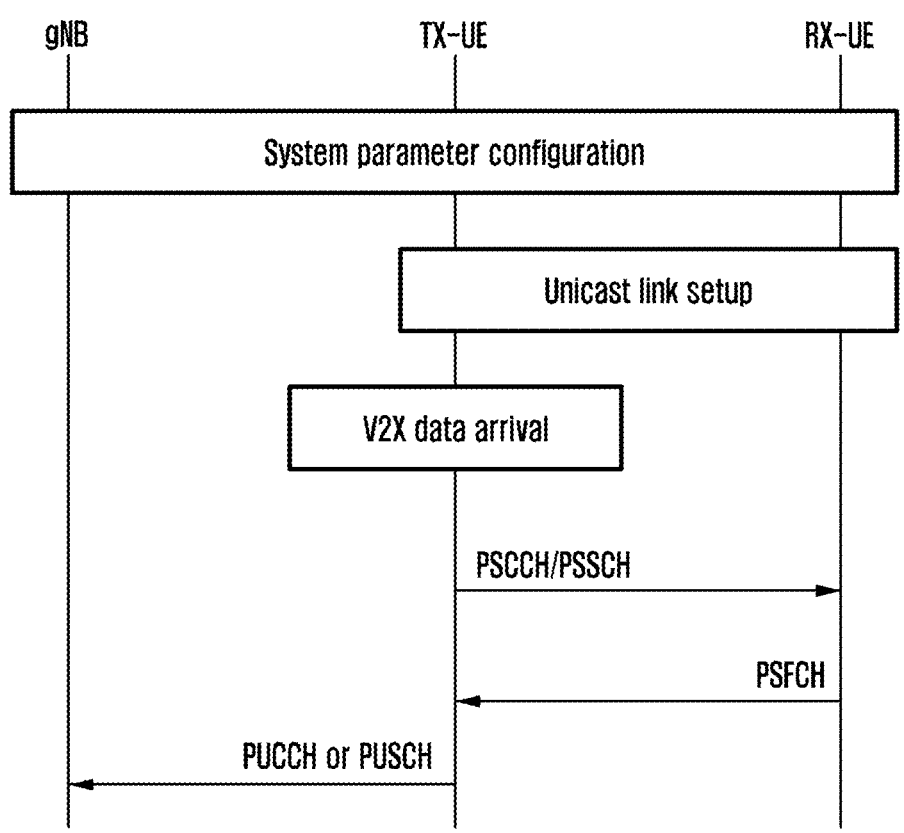
FIG. 5 shows another example for a sidelink unicast communication procedure according to an embodiment of the disclosure.

FIG. 5 shows another example for a sidelink unicast communication procedure according to an embodiment of the disclosure.

More specifically, FIG. 5 illustrates a V2X communication procedure based on mode 2 resource allocation described in FIG. 2. In FIG. 5, a base station may configure, based on system information, a parameter for V2X communication, to a V2X transmission UE and V2X reception UEs in a cell. The parameter may include at least one piece of the parameter information illustrated in FIG. 4.

As illustrated in FIG. 5, when data, which is to be transmitted to the V2X reception UE by the V2X transmission UE, is generated, the V2X transmission UE transmits SCI to the V2X reception UE on PSCCH and transmits sidelink data to the V2X reception UE on PSSCH. The SCI may further include at least one of resource allocation information used for sidelink data transmission, MCS information applied to sidelink data, group destination ID information, transmitter ID information, unicast destination ID information, power control information for controlling sidelink power, timing advance information, DMRS configuration information for sidelink transmission, packet repetitive transmission-related information, for example, information on the number of packet repetitive transmissions, resource allocation-related information when performing packet repetitive transmission, a redundancy version (RV), and an HARQ process ID. The SCI may further include information indicating a resource at which feedback information (A/N information) for the sidelink data is transmitted.

The V2X reception UE having received the SCI receives the sidelink data. The V2X reception UE may receive, on PSSSCH, the sidelink data based on the SCI. Thereafter, the V2X reception UE transmits ACK/NACK information indicating whether decoding of the sidelink data is successful or failed, to the V2X transmission UE on PSFCH. Feedback information transmission for the sidelink may be applied to unicast transmission or groupcast transmission, but does not exclude a case of broadcast transmission. If the sidelink transmission corresponds to groupcast transmission, each UE having received groupcast data may transmit feedback information by using different PSFCH resources. Alternatively, each UE having received groupcast data may transmit feedback information by using the same PSFCH resource, and at this time, only NACK information may be fed back (that is, if the UE having received the data determines ACK, feedback is not provided). The PSFCH resource may include not only a resource classified in a time or/and frequency domain, but also a resource classified using a code, such as a scrambling code and an orthogonal cover code, and a resource classified using different sequences (and a cyclic shift applied to the different sequences).

As illustrated in FIG. 4, the base station in FIG. 5 may configure the V2X transmission UE to report HARQ feedback received from the V2X reception UE, on the basis of system information or RRC. In this case, the V2X transmission UE may transmit the sidelink HARQ feedback received from the V2X reception UE to the base station via the physical uplink control channel (PUCCH) or the physical uplink shared channel (PUSCH). The base station may configure whether the V2X transmission UE is able to multiplex and transmit the sidelink HARQ feedback information received from the V2X reception UE and uplink control information (UCI) for the existing Uu.

If the base station does not configure to multiplex the sidelink HARQ feedback information and UCI information, the V2X transmission UE is unable to multiplex the sidelink HARQ feedback information and uplink control information (UCI) information for the Uu and to transmit the multiplexed information to one PUCCH. In this case, the base station may independently configure a PUCCH for transmitting the sidelink HARQ feedback information and a PUCCH for transmitting the UCI information. That is, the PUCCH via which the sidelink HARQ feedback information is transmitted independently exists, and no UCI information may be transmitted in the corresponding PUCCH.

Alternatively, when the base station configures multiplexing of the sidelink HARQ feedback information and the UCI information, the V2X transmission UE may multiplex the sidelink HARQ feedback information and the UCI information so as to transmit the multiplexed information via one PUCCH. When the sidelink HARQ feedback information is assumed to be N1 bits and the UCI information is assumed to be N2 bits, a multiplexing order may follow N2+N1 (i.e., the sidelink HARQ feedback information is multiplexed after the UCI information). If a code rate for the sum of the sidelink HARQ feedback bits and the UCI bits, which are multiplexed and transmitted via the PUCCH, is greater than a coding rate configured by the base station, the V2X transmission UE may give up transmission of the sidelink HARQ feedback information (i.e., dropping the sidelink HARQ feedback information). If the V2X transmission UE gives up transmission of the sidelink HARQ feedback information, the sidelink HARQ feedback information may be transmitted on another PUCCH resource or may be multiplexed with other UCI bits and transmitted on another PUCCH resource.

In FIG. 5, a scenario, in which the V2X transmission UE and the reception UE both exist in the coverage of the base station, is assumed. Although not illustrated in FIG. 5, FIG. 5 may also be applied when both the V2X transmission UE and the reception UE exist outside the coverage of the base station. In this case, the V2X transmission UE and the reception UE may receive, in advance, the configuration of the above-mentioned information for V2X communication. Although not illustrated in FIG. 5, FIG. 5 may also be applied to a scenario in which one of the V2X transmission UE and the V2X reception UE is in the coverage of the base station and the other UE is outside the coverage of the base station. In this case, the UE existing in the coverage of the base station may receive information for V2X communication, which is configured by the base station, and the UE existing outside the coverage of the base station may receive information for V2X communication, which is configured in advance. In the above example, "information for V2X communication" may be interpreted as information for at least one of the parameters for V2X communication mentioned in FIG. 4. In the above example, the meaning of being configured in advance may be interpreted as using a value embedded in a UE when the UE is shipped. Another meaning of being configured in advance may be interpreted as using a preconfigured value according to information configured by the UE at a specific time. Still another meaning of being configured in advance may refer to using information for V2X communication, which has been acquired in advance via an RRC configuration by accessing the base station by the transmission UE or the V2X reception UE, or using most recently acquired information when information for the V2X communication has been acquired via system information of the base station.

Although not illustrated in FIG. 5, it may be assumed that, before the V2X transmission UE transmits PSCCH/PSSCH to the V2X reception UE, service discovery with the V2X reception UE, a direct link setup procedure, and a PC5 RRC configuration procedure have been completed via the procedures mentioned in FIG. 3.

In FIG. 5, unicast communication in which only one V2X transmission UE exists is described as an example, but the same may be applied to groupcast communication and broadcast communication, in which two or more V2X transmission UEs exist.

Figure 6:
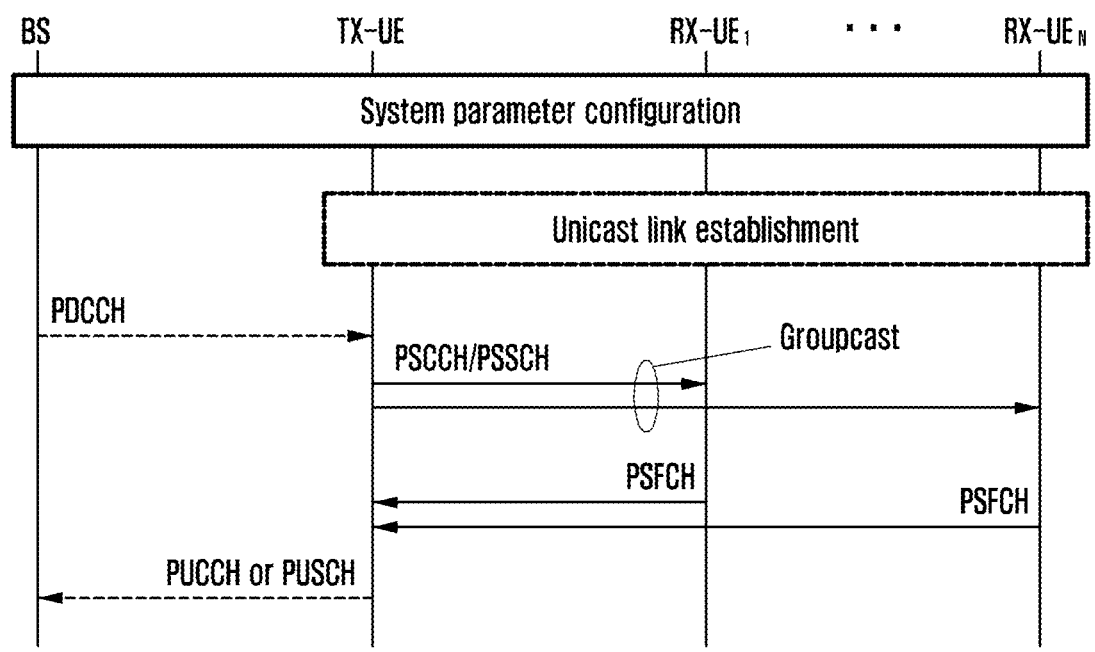
FIG. 6 shows an embodiment for a method of operating a hybrid automatic repeat request (HARQ) in sidelink groupcast communication according to an embodiment of the disclosure.

FIG. 6 shows an embodiment for a method of operating an HARQ in V2X groupcast communication according to an embodiment of the disclosure.

FIG. 6 illustrates a scenario in which a transmission UE and reception UEs exist in the coverage of a base station, and thus the transmission UE and the reception UEs may receive system information for sidelink communication from the base station. A parameter for sidelink communication may be configured in the UEs having received the system information. When the transmission UE and the reception UEs are outside the coverage of the base station (out-of-coverage scenario of FIG. 1), the transmission UE and the reception UEs may have parameters for sidelink communication, which are configured in advance or configured via a sidelink master information block (SL-MIB) transmitted via a sidelink synchronization channel.

Prior to groupcast communication, all the transmission UE and the reception UEs in the same group may perform PC5 RRC connection establishment via the unicast link establishment procedure described in FIG. 3. However, there may be a scenario of groupcast communication performed without PC5 RRC connection establishment. In this scenario, the unicast link establishment procedure illustrated in FIG. 6 may be omitted. Although FIG. 6 illustrates that the unicast link establishment procedure is performed after receiving system parameter configuration information of the base station, the unicast link establishment procedure may be performed first, and the system parameter configuration information may be received thereafter. If there is no base station, after performing the unicast link establishment procedure, the parameters for sidelink communication may be configured via the SL-MIB.

When the mode-1 resource allocation scheme illustrated in FIG. 4 is used in FIG. 6, the base station may transmit sidelink scheduling information to the groupcast transmission UE via a physical downlink control channel (PDCCH). The transmission UE having received the information may transmit sidelink control information and data information to the reception UEs via PSCCH and PSSCH, respectively, by using the scheduling information of the base station. As described in FIG. 3, a destination identifier (e.g., destination L2 ID) and a transmission identifier (e.g., sender L2 ID) may be included in PSCCH so as to be transmitted. 1-bit information on whether to activate or deactivate HARQ operation may be included. More specifically, even if resource pool configuration information includes PSFCH resource configuration information for HARQ operation (e.g., a PSFCH period), the transmission UE may deactivate HARQ operation when the SCI includes information indicating deactivation of HARQ operation. The reasons are as follows.

In a case of broadcast communication, sidelink control information and data information are transmitted to a plurality of unspecified UEs, and thus HARQ operation in broadcast communication may be difficult. In the case of unicast and groupcast communication, HARQ operation may or may not be configured according to QoS of transmitted sidelink data. For example, some specific sidelink data has a high level of requirements for reception reliability, and therefore HARQ operation may be configured. However, other specific sidelink data does not have a high level of requirements for reception reliability, and therefore HARQ operation may be not configured. As another example, some specific sidelink data has a high level of requirement for delay in sidelink communication (that is, a delay time should be short), and therefore HARQ operation may not be configured. However, other specific sidelink data does not have a high level of requirements for a delay time (that is, a delay time may be long), and therefore HARQ operation may be configured. As described above, HARQ operation may be configured or canceled according to the QoS of sidelink data transmitted by the transmission UE. Determination on whether HARQ operation is configured may vary according to QoS, and therefore the determination may be performed in an application layer that manages QoS or a V2X layer that has received QoS from an application.

However, in this case, HARQ operation of the reception UE may not be possible. More specifically, HARQ operation should be performed in a PHY/MAC layer, but if the V2X layer or the application layer or the like controls HARQ operation, the HARQ operation cannot be performed in the PHY/MAC layer of the reception UE. That is, the PHY/MAC layer of the reception UE should be aware of whether to operate HARQ before transferring of a corresponding packet to the V2X layer or the application layer of the reception UE, and based on this, HARQ combining may be performed in the PHY layer. Therefore, for HARQ operation of the PHY/MAC layer, the transmission UE may include a 1-bit indicator indicating whether to operate HARQ via SCI.

As illustrated in FIG. 5, a mode-2 resource allocation scheme may be used in FIG. 6. In this case, the PDCCH of FIG. 6 may be omitted.

The reception UEs having received PSCCH and PSSCH from the transmission UE may determine whether a destination L2 ID included in the SCI of PSCCH refers to themselves, and when the destination L2 ID refers to themselves, PSSCH may be decoded based on time and/or frequency resource allocation information of PSSCH included in the SCI. Based on PSSCH decoding, the reception UEs may finally determine whether sidelink data is transmitted to themselves, via the destination L2 ID included in a MAC-CE transmitted via PSSCH. That is, the destination L2 ID is composed of N bits, and N1 bits may be transmitted via the SCI and the remaining N2 bits may be transmitted via the MAC-CE (N=N1+N2). If it is determined that the destination L2 ID included in the received SCI does not refer to itself (the reception UE), the reception UE may not decode PSSCH indicated by the SCI.

If PSCCH and PSSCH transmitted from the transmission UE refer to the destination L2 ID of the reception UE, the reception UE may transmit HARQ-ACK (if decoding is successful) and HARQ-NACK (if decoding fails) to the transmission UE depending on whether decoding of the received PSSCH is successful.

If HARQ feedback information received from a plurality of reception UEs includes at least one piece of HARQ-NACK information, the transmission UE having received the HARQ feedback information may perform retransmission of the PSSCH. If all HARQ feedback information received from all reception UEs is HARQ-ACK, the transmission UE having received the same may not perform retransmission of the PSSCH. That is, the transmission UE does not perform retransmission for data that has already been transmitted, and when new sidelink data to be transmitted is generated, the transmission UE may transmit a new PSSCH. If no sidelink data to be newly transmitted is generated, the transmission UE may stop PSSCH transmission.

As illustrated in FIG. 6, the transmission UE may transmit sidelink HARQ feedback information received from the reception UE to the base station according to the configuration of the base station. Here, the sidelink HARQ feedback information may be transmitted via PUCCH or PUSCH, and specific operations may follow one of the methods described in FIG. 4 and FIG. 5.

For the HARQ operation in groupcast, the transmission UE may need to know information on the reception UE in the same group. For example, for the sidelink HARQ operation, the transmission UE should identify sidelink HARQ feedback information transmitted from different reception UEs. That is, the transmission UE may need to determine which reception UE has transmitted HARQ-ACK and which reception UE has transmitted HARQ-NACK. Therefore, the sidelink HARQ operation method illustrated in FIG. 6 may be applied a case where a unicast link connection is established between all the transmission UE and the reception UEs in the group. However, FIG. 6 cannot be applied in a case where a unicast link connection is not established between all the transmission UE and the reception UEs in the group. An HARQ operation method for this will be described in FIG. 7.

Figure 7:
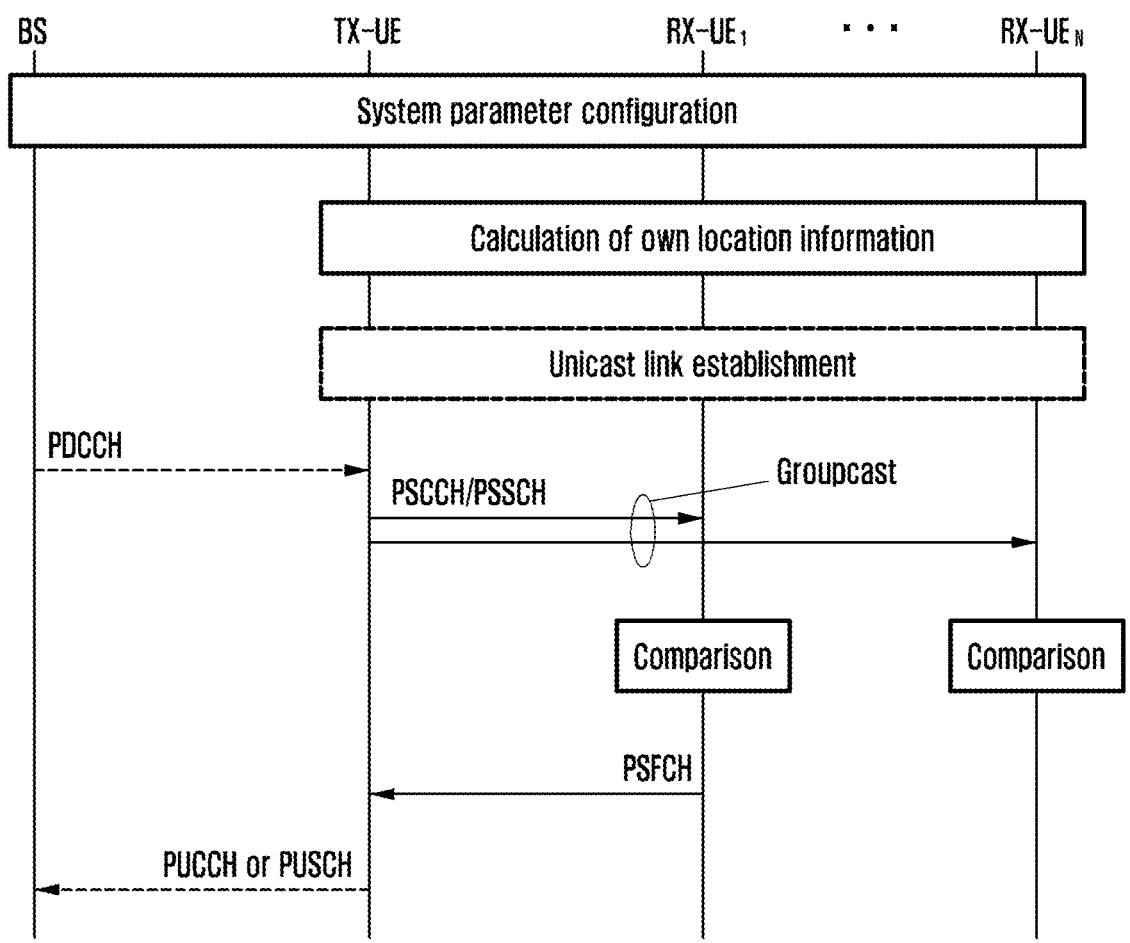
FIG. 7 shows another embodiment for a method of operating an HARQ in sidelink groupcast communication according to an embodiment of the disclosure.

FIG. 7 shows another embodiment for a method of operating an HARQ in sidelink groupcast communication according to an embodiment of the disclosure.

As described in FIG. 6, a transmission UE and reception UEs in FIG. 7 may receive system information for sidelink communication from a base station. A parameter for sidelink communication may be configured in the UEs having received the system information. When the transmission UE and the reception UEs are outside the coverage of the base station (out-of-coverage scenario of FIG. 1), the transmission UE and the reception UEs may have parameters for sidelink communication, which are configured in advance or configured via a sidelink master information block (SL-MIB) transmitted via a sidelink synchronization channel.

FIG. 7 is a method for sidelink HARQ operation in a groupcast communication scenario performed without PC5

RRC connection establishment. Therefore, a procedure of unicast link establishment between the transmission UE and the reception UEs may be omitted. However, the HARQ operation method of FIG. 7 may be applied even when the unicast link establishment procedure is performed between the transmission UE and the reception UEs. In this scenario, the unicast link establishment procedure illustrated in FIG. 7 may be included. Although FIG. 7 illustrates that the unicast link establishment procedure is performed after receiving system parameter configuration information of the base station, the unicast link establishment procedure may be performed first, and the system parameter configuration information may be received thereafter. If there is no base station, after performing the unicast link establishment procedure, the parameters for sidelink communication may be configured via the SL-MIB.

The difference between FIG. 6 and FIG. 7 is that the transmission UE and the reception UEs in FIG. 7 may calculate their own location information. The location information may refer to an ID of a zone including a UE or may refer to coordinates (x, y) of the UE, which are calculated based on the latitude and longitude of the UE, but is not limited thereto.

When the mode-1 resource allocation scheme illustrated in FIG. 4 is used in FIG. 7, the base station may transmit sidelink scheduling information to the groupcast transmission UE via a physical downlink control channel (PDCCH). The transmission UE having received sidelink scheduling information via PDCCH may transmit sidelink control information and data information to the reception UEs via PSCCH and PSSCH, respectively, by using the scheduling information. As mentioned in FIG. 3, a destination L2 ID and a transmitter L2 ID may be included in PSCCH so as to be transmitted. 1-bit information on whether to activate or deactivate HARQ operation may be included. More specifically, even if resource pool configuration information includes PSFCH resource configuration (e.g., a PSFCH period) information for HARQ operation, the transmission UE may deactivate HARQ operation by adding information indicating the deactivation of HARQ operation to the SCI. The reasons are as follows.

In a case of broadcast communication, sidelink control information and data information are transmitted to a plurality of unspecified UEs, and thus HARQ operation in broadcast communication may be difficult. In the case of unicast and groupcast communication, HARQ operation may or may not be configured according to QoS of transmitted sidelink data. For example, some specific sidelink data has a high level of requirements for reception reliability, and therefore HARQ operation may be configured. However, other specific sidelink data does not have a high level of requirements for reception reliability, and therefore HARQ operation may be not configured. As another example, some specific sidelink data has a high level of requirement for delay in sidelink communication (that is, a delay time should be short), and therefore HARQ operation may not be configured. However, other specific sidelink data does not have a high level of requirements for a delay time (that is, a delay time may be long), and therefore HARQ operation may be configured. As described above, HARQ operation may be configured or canceled according to the QoS of sidelink data transmitted by the transmission UE. Determination on whether HARQ operation is configured may vary according to QoS, and therefore the determination may be performed in an application layer that manages QoS or a V2X layer that has received QoS from an application.

However, in this case, HARQ operation of the reception UE may not be possible. More specifically, HARQ operation should be performed in a PHY/MAC layer, but if the V2X layer or the application layer or the like controls HARQ operation, the HARQ operation cannot be performed in the PHY/MAC layer of the reception UE. That is, the PHY/MAC layer of the reception UE should be aware of whether to operate HARQ before transferring of a corresponding packet to the V2X layer or the application layer of the reception UE, and based on this, HARQ combining may be performed in the PHY layer. Therefore, for HARQ operation of the PHY/MAC layer, the transmission UE may include a 1-bit indicator indicating whether to operate HARQ, via SCI.

As illustrated in FIG. 5, a mode-2 resource allocation scheme may be used in FIG. 7. In this case, the operation in FIG. 7, in which the transmission UE receives scheduling information from the base station via the PDCCH, may be omitted.

In addition to the above-described information, the transmission UE may add, to the SCI, its own location information and a range requirement of a sidelink data packet, which is transmitted thereby, and may transmit the SCI via PSCCH. The range requirement is not limited to reception via the SCI, and a preconfigured value may be used for the UE, or a value configured by the base station may be used. The location information of the transmission UE may refer to an ID of a zone in which the transmission UE is located, or may refer to coordinates (x, y) of the transmission UE, which are calculated based on the latitude and longitude of the transmission UE, but is not limited thereto. The range requirement may be expressed in meters, and may refer to information of a distance over which the sidelink data packet should be transmitted. For example, the range requirement may refer to at least one of a maximum or minimum distance over which the sidelink data packet should be transmitted.

The reception UEs having received PSCCH and PSSCH from the transmission UE may determine whether a destination L2 ID included in the SCI of PSCCH refers to themselves, and when the destination L2 ID refers to itself (the reception UE), PSSCH may be decoded based on time and/or frequency resource allocation information of PSSCH included in the SCI. Based on PSSCH decoding, the reception UEs may finally determine whether sidelink data is transmitted to themselves, via the destination L2 ID included in a MAC-CE transmitted via PSSCH. That is, the above-described destination L2 ID is composed of N bits, and N1 bits may be transmitted via the SCI and the remaining N2 bits may be transmitted via the MAC-CE (N=N1+N2). If it is determined that the destination L2 ID included in the received SCI does not refer to itself (the reception UE), the reception UE may not decode PSSCH indicated by the SCI.

If PSCCH and PSSCH transmitted from the transmission UE refer to a destination L2 ID of a reception UE, the reception UE may calculate the distance between the transmission UE and itself (the reception UE), on the basis of its own location information and the location information of the transmission UE, which is included in the SCI information of PSCCH, received from the transmission UE. The distance between the transmission UE and reception UE-N is defined to be $d_N$. The reception UE may compare a dui value with a $d_N$ value via the range requirement (defined to be $d_{TH}$) included in the received SCI information of PSCCH. The reception UE may perform HARQ operation according to a comparison result of the $d_{TH}$ and $d_N$ values. For example, if the distance between the transmission UE and the reception UE, which has been measured (calculated or obtained) by the reception UE, is greater than (or greater than or equal to) the range requirement, the reception UE may not transmit HARQ feedback information to the transmission UE regardless of whether PSSCH received thereby is successfully decoded. That is, in a case of $d_N>d_{TH}$ or $d_N \geq d_{TH}$, the reception UE may not provide HARQ feedback. Alternatively, in a case of $d_N \leq d_{TH}$ or $d_N<d_{TH}$, the reception UE may transmit HARQ feedback to the transmission UE. The reception UE may transmit HARQ-NACK to the transmission UE only when decoding of PSSCH fails. That is, even if the distance condition is satisfied, when the decoding of PSSCH is successful, HARQ-ACK may not be transmitted to the transmission UE. FIG. 7 shows an example of a case where reception UE-1 transmits HARQ-NACK to the transmission UE via PSFCH.

If two or more reception UEs satisfy the condition (i.e., $d_N \leq d_{TH}$ or $d_N<d_{TH}$) and the PSSCH decoding fails, the two or more reception UEs may transmit HARQ-NACK to the transmission UE. Time/frequency/code resources of PSFCH, which are used for HARQ-NACK transmission by the two or more reception UEs may be the same. Therefore, the transmission UE having received HARQ feedback information is not required to know the number of reception UEs having transmitted NACK information, and the transmission UE having received the NACK information may perform retransmission of PSSCH. If the transmission UE does not receive NACK information and sidelink data that will be newly transmitted is generated, the transmission UE may transmit a new PSSCH. If no sidelink data to be newly transmitted is generated, the transmission UE may stop PSSCH transmission.

As illustrated in FIG. 7, the transmission UE may transmit sidelink HARQ feedback information received from the reception UE to the base station according to the configuration of the base station. Here, the sidelink HARQ feedback information may be transmitted via PUCCH or PUSCH, and specific operations may follow one of the methods described in FIG. 4 and FIG. 5.

Whether to use the sidelink HARQ operation of FIG. 6 or the sidelink HARQ operation of FIG. 7 in groupcast communication may be included in resource pool configuration information configured by the base station, or may be included in preconfigured resource pool configuration information when there is no base station. As another example, whether to apply FIG. 6 and FIG. 7 may be implicitly or explicitly indicated by the transmission UE via the SCI. As an example of an implicit indication, when the location information and range request information of the transmission UE are included in the SCI, the reception UE may indirectly recognize that the method of FIG. 7 should be used. When the location information and range requirement information of the transmission UE are not included in the SCI, the reception UE may implicitly recognize that the method of FIG. 6 should be used. As an example of an explicit indication, the transmission UE may add a 1-bit indicator to the SCI to transmit the indicator. The UE having received the indicator may apply the method of FIG. 6 if the indicator indicates "1" and may apply the method of FIG. 7 if the indicator indicates "0". Depending on a configuration, it may be configured to apply the method of FIG. 6 when the indicator indicates "0", and may apply the method of FIG. 7 when the indicator indicates "1".

Figure 8:
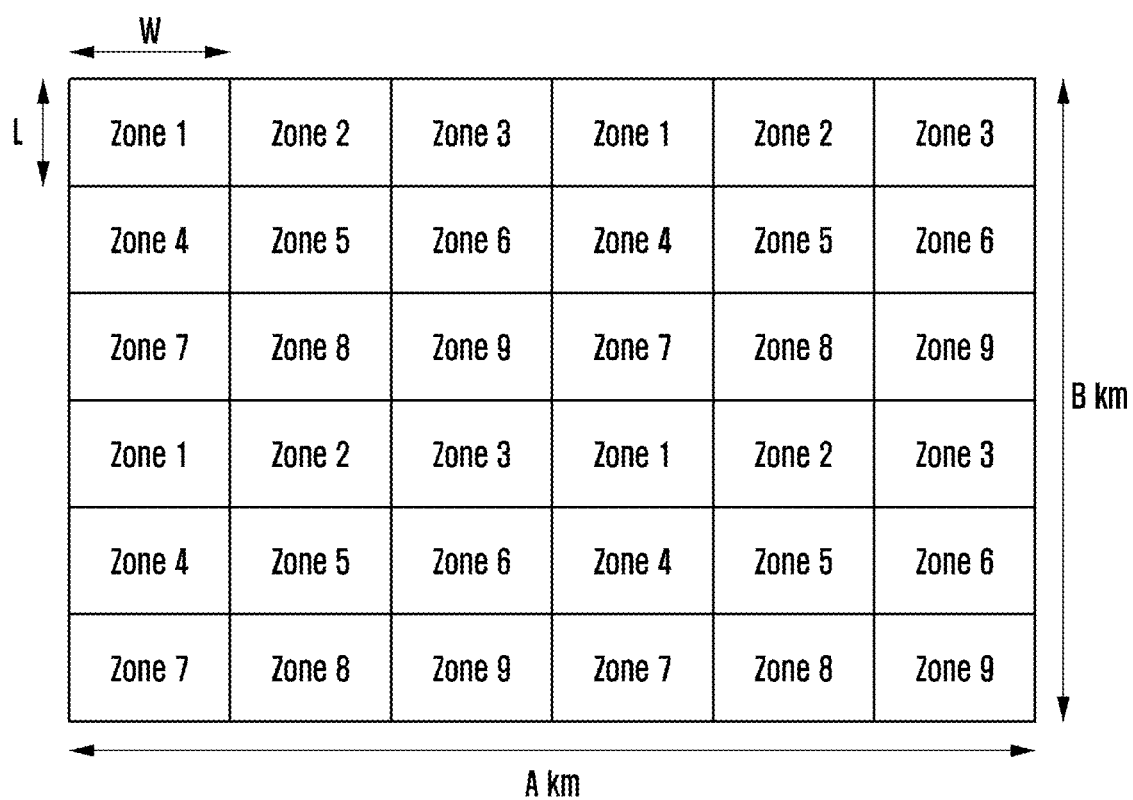
FIG. 8 shows an embodiment for a method of using a zone ID in sidelink communication according to an embodiment of the disclosure.

FIG. 8 shows an embodiment for a method of using a zone ID in sidelink communication according to an embodiment of the disclosure.

A base station may transmit zone configuration information to a sidelink UE in a cell via the SL-ZoneConfig information element (IE) on the basis of V2X system information. SL-ZoneConfig IE may include parameters, such as zoneWidth indicating a width of a zone (W in FIG. 8), zoneLength indicating a length of the zone (L in FIG. 8), zoneIdLongiMod indicating the number of zones configured based on longitude, and zoneIdLatiMode indicating the number of zones configured based on latitude. Each of zoneWidth and zoneLength parameters may be configured to one of 5 m, 10 m, 20 m, 50 m, 100 m, 200 m, and 500 m. Each of zoneIdLongiMod and zoneIdLatiMode parameters may be configured to integers from 1 to 4.

That is, for the area configured by horizontal A km and vertical B km in FIG. 8, the horizontal and vertical size of each zone and the number of zones included in (A×B) km may be configured using the parameters in the SL-ZoneConfig IE, which are configured by the base station (If there is no base station, such configurations may be performed in advance).

If the base station configures two or more sidelink transmission resource pools (if there is no base station, two or more sidelink transmission resource pools are configured in advance), a zone ID may be included in the configured transmission resource pool information. For example, if two sidelink transmission resource pools are configured from the base station (or configured in advance), transmission resource pool 1 may correspond to zone ID=3 and transmission resource pool 2 may correspond to zone ID=7. The UE may calculate zone ID information to be used by itself on the basis of [Equation 1] below, and may use a transmission resource pool in which the zone ID calculated by the UE and the zone ID (or the zone ID included in resource pool information configured in advance) included in the resource pool information configured by the base station are the same.

$x1 = \text{Floor}(x/L) \text{Mod } Nx;$ $y1 = \text{Floor}(y/W) \text{Mod } Ny;$ Zone $ID = y1*Nx + x1$ [Equation 1]

In [Equation 1], L and W are parameters corresponding to zoneLength and zoneWidth, respectively, and Nx and Ny are parameters corresponding to zoneIdLongiMod and zoneIdLatiMod, respectively. Further, x may refer to a difference from a current longitude position of a UE on the basis of coordinates (0, 0) that is a reference point (x, y), and y may refer to a difference from a current latitude position of the UE on the basis of coordinates (0, 0) that is a reference point (x, y). For the reference point (0, 0), the only coordinate in the world, for example, the position of the Greenwich Observatory, may be configured.

Figure 9:
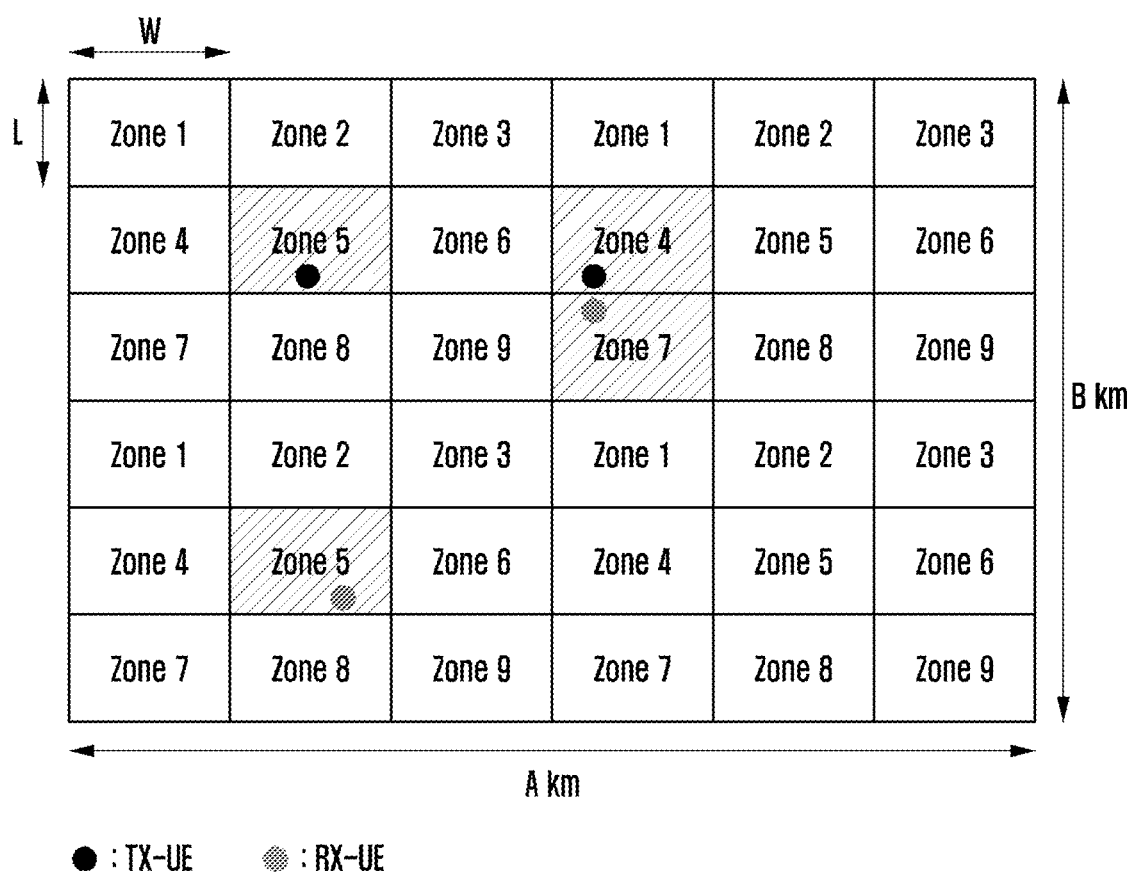
FIG. 9 shows an embodiment for a problem in HARQ operation using a zone ID in sidelink communication according to an embodiment of the disclosure.

FIG. 9 shows an example for a problem in HARQ operation using a zone ID in sidelink communication according to an embodiment of the disclosure.

For HARQ operation based on the distance between the transmission UE and the reception UE mentioned in FIG. 7, the transmission UE transmits its own zone ID information to the reception UE, and should transmit a range requirement to the reception UE at the same time. The zone ID information indicates an index of a zone, and the range requirement is expressed in units of "meter". In this case, the reception UE may determine whether to transmit HARQ-NACK feedback, by converting, into a zone, the range requirement transmitted by the transmission UE via SCI, or the reception UE may estimate a location of the transmission UE from the zone ID provided by the transmission UE via the SCI, may estimate a distance between the transmission UE and itself (the reception UE), and may determine whether to transmit HARQ-NACK feedback, via comparison with the range requirement.

When the reception UE converts the range requirement transmitted by the transmission UE into a zone, the reception UE may feed back HARQ-NACK information to the transmission UE only if the difference between the zone ID provided by the transmission UE and a zone ID to which the reception UE itself belongs has a value smaller than or equal to a certain value. The reception UE may not transmit HARQ feedback to the transmission UE if the difference between the zone ID provided by the transmission UE and the zone ID to which the reception UE itself belongs has a value greater than or equal to the certain value. For example, suppose that the reception UE should feedback HARQ-NACK information to the transmission UE, only when the difference between the zone ID of the transmission UE and the zone ID of the reception UE has a value smaller than 3. In this case, as shown in FIG. 9, when the transmission UE is located in a zone 4 and the reception UE is located in a zone 7, ambiguity may occur. That is, since the difference between the zone ID of the transmission UE and the zone ID of the reception UE is 3, the reception UE does not transmit HARQ feedback to the transmission UE. However, as shown in FIG. 9, the transmission UE and the reception UE may actually exist at very close locations, and it may be desirable for the reception UE to transmit HARQ feedback to the transmission UE. Therefore, in this case, ambiguity may occur in the HARQ operation mentioned in FIG. 7.

When the reception UE estimates the distance between the zone ID of the transmission UE and itself (the reception UE) and compares the distance with the range requirement so as to determine whether to transmit HARQ-NACK feedback, the reception UE should measure the distance between the transmission UE and the reception UE on the basis of its own current location and zone ID information received from the transmission UE. As illustrated in FIG. 9, ambiguity may occur in measuring the distance between the transmission UE and the reception UE. For example, if the transmission UE is located in a zone 5 and the reception UE is located in another zone 5, the reception UE is unable to know the zone 5, in which the transmission UE is located, from among the zone 5s in FIG. 9 (that is, there are four zone 5s in FIG. 9). Therefore, the reception UE is unable to determine whether the distance from the transmission UE satisfies the range requirement.

There is a need for a solution to the above-mentioned problems.

Figure 10:
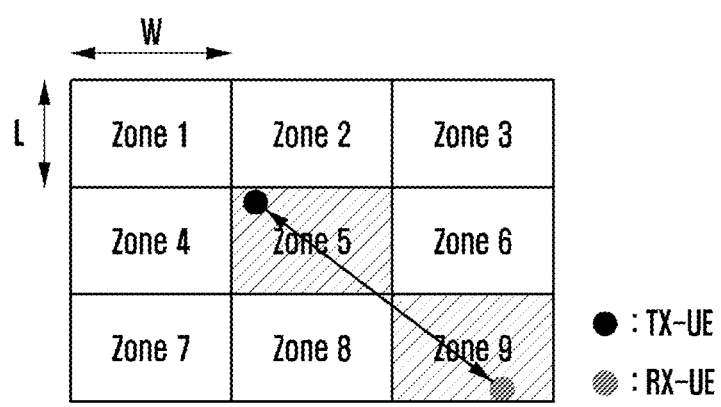
FIG. 10 shows another embodiment for a problem in HARQ operation using a zone ID in sidelink communication according to an embodiment of the disclosure.

FIG. 10 shows another example for a problem in HARQ operation using a zone ID in sidelink communication according to an embodiment of the disclosure.

When the reception UE estimates the distance between the zone ID of the transmission UE and itself (the reception UE) and compares the distance with the range requirement so as to determine whether to transmit HARQ-NACK feedback, the reception UE should measure the distance between the transmission UE and the reception UE on the basis of its own current location and zone ID information received from the transmission UE. As illustrated in FIG. 10, ambiguity may occur in measuring the distance between the transmission UE and the reception UE. For example, suppose that a transmission UE transmits its own zone ID (ID=5) to a reception UE via SCI of PSCCH. The transmission UE may be located in the northwest of zone 5, as shown in FIG. 10. However, the reception UE does not know an exact location of the transmission UE, so that it may be necessary to make assumptions about the location of the transmission UE in a corresponding zone, for distance calculation.

For example, the reception UE may assume that the transmission UE is located at the center of the zone (where zone ID=5). As another example, the reception UE may assume that a vertex of the zone, in which the transmission UE is located, farthest from its own location is the location of the transmission UE. More specifically, suppose that coordinates of four vertices of zone 5 are (a1, b1), (a2, b2), (a3, b3), and (a4, b4), respectively. And, assume that the location of the reception UE is (x, y). The reception UE may calculate a distance from each of vertex coordinates to itself on the basis of coordinates for the four vertices and its own coordinates (x, y), and may assume that vertex coordinates having a longest distance correspond to the location of the transmission UE. The above-described example may be applied for a closest vertex. That is, the reception UE may assume that a vertex of the zone, in which the transmission UE is located, closest (or having a shortest distance) from its own location is the location of the transmission UE.

As another example, the reception UE may assume the location of the transmission UE by moving the coordinates of the zone, in which the reception UE itself is located, in parallel to the zone in which the transmission UE is located. For example, as shown in FIG. 10, assume that the transmission UE is located in zone 5 and the reception UE is located in zone 9. And, suppose W=50 m and L=10 m. The reception UE may assume that the transmission UE is located at (x−50, y−10) on the basis of its own location (x, y) in zone 9.

Figure 11:
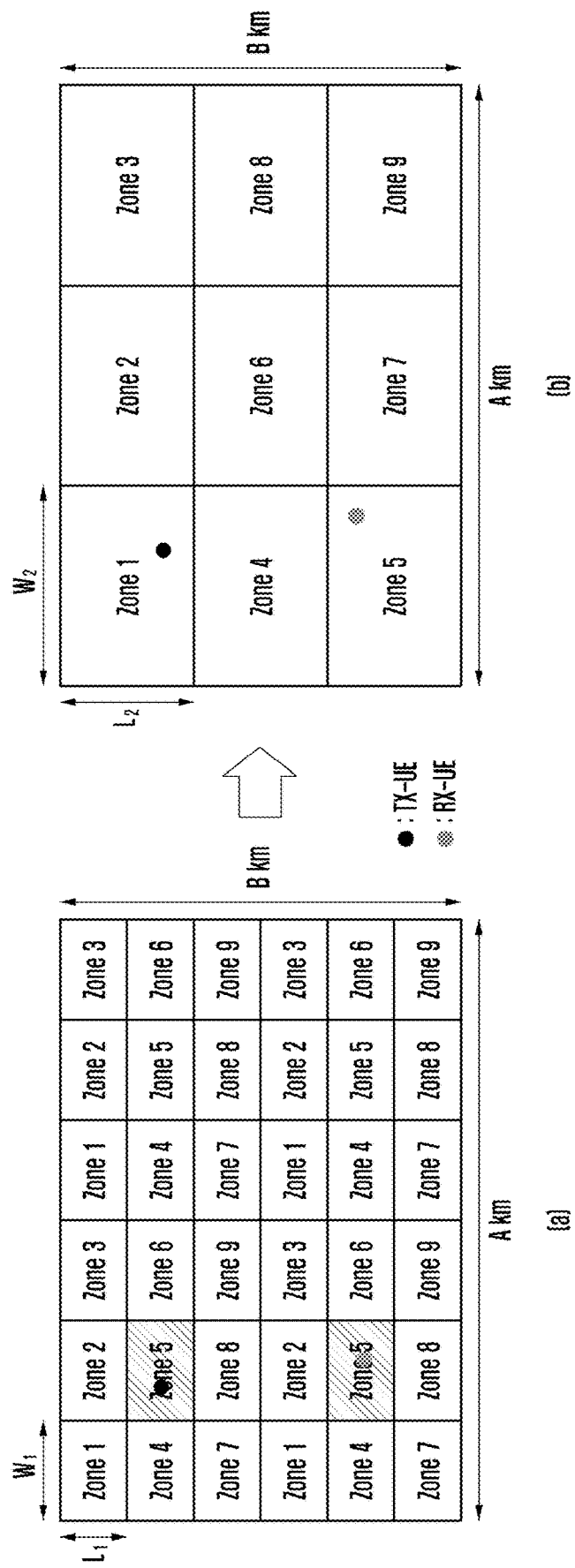
FIG. 11 shows an embodiment for a method for calculating a zone ID in distance-based sidelink HARQ operation according to an embodiment of the disclosure.

FIG. 11 shows an embodiment for a method for calculating a zone ID in distance-based sidelink HARQ operation according to an embodiment of the disclosure.

FIG. 11 is a method for solving a problem in a case where a transmission UE and a reception UE exist in different locations but use the same zone ID, as described in FIG. 9. In an embodiment of FIG. 11, the problem described in FIG. 9 may be solved by configuration of zones so that there is no zone having the same ID. For example, the configuration may be performed so that there is no zone having the same ID in the following way.

FIG. 11 illustrates that W, L, Nx, and Ny parameters used for zone ID calculation for transmission resource pool selection, and W, L, Nx, and Ny parameters used for zone ID calculation in distance-based sidelink HARQ operation may be configured differently from each other. More specifically, a base station may transmit W1, L1, Nx1, and Ny1 parameters to the transmission UE via system information or RRC configuration information, so that the transmission UE calculates a zone ID for selecting a transmission resource pool. The base station may transmit W2, L2, Nx2, and Ny2 parameters to a sidelink transmission UE and a sidelink reception UE via system information or RRC configuration information in order the transmission UE and the reception UE to solve ambiguity in sidelink HARQ operation based on a zone ID. W1, L1, Nx1, and Ny1 parameters and W2, L2, Nx2, and Ny2 parameters are different from each other, and specifically, at least one of $W1 \leq W2$, $L1 \leq L2$, $Nx1 \geq Nx2$, and $Ny1 \geq Ny2$ relationships should be satisfied. That is, it is possible to make a specific area have no zone with the same ID by configuring W and L values to be large and/or by configuring Nx and Ny values to be small, as shown in FIG. 11.

As another example, W1, L1, Nx1, and Ny1 parameters and W2, L2, Nx2, and Ny2 parameters may be related to each other. More specifically, it may be defined that 1)

W1=α·W2, L1=β·L2, Nx1=δ·Nx2, and Ny1=γ·Ny2, or may be defined that 2) W2=α·W1, L2=β·L1, Nx2=δ·Nx1, and Ny2=γ·Ny1. An example for the case of 1) may be α=β=0.5 and δ=γ=2. An example for 2) may be α=β=4 and δ=γ=1. Although α and β are illustrated to have the same value, α and β may have values different from each other. Similarly, although δ and γ are illustrated to have the same value, δ and γ may have values different from each other. As described above, if W1, L1, Nx1, and Ny1 parameters and W2, L2, Nx2, and Ny2 parameters are correlated with each other via α, β, δ, and γ, the base station may transmit configuration information for one set of W1, L1, Nx1, and Ny1 parameters (set 1) or W2, L2, Nx2, and Ny2 parameters (set 2) to the sidelink UE. In addition, α, β, δ, and γ may be configured. Information on α, β, δ, and γ may be included in resource pool configuration information or fixed values may be used at all times.

As another example, there may be a method of adding a zone ID field included in SCI, without independently configuring W1, L1, Nx1, and Ny1 parameters and W2, L2, Nx2, and Ny2 parameters. More specifically, in FIG. 11 (A), there are nine zone IDs of zone 1 to zone 9, and four same zone IDs exist in each zone ID (e.g., four zone IDs (where zone ID=5) exist). Therefore, 4 bits may be required to distinguish a zone ID, and 2 bits may be required to distinguish an actual location in each zone ID. In the above-described example, the transmission UE may add information having a total of 6 bits to the SCI, and may transmit the SCI to the reception UE via PSCCH. 2 bits for distinguishing the actual position may be a most significant bit (MSB) located on the left side of 6 bits or a least significant bit (LSB) located on the right side. Generalization is as follows. It may be assumed that a specific area configured by horizontal A km and vertical B km includes M zone IDs, and each zone ID is repeated N times. The transmission UE adds, to the SCI, $2^{Floor(M/2)}$ bits+$2^{Floor(N/2)}$ bits=K bits, which is the sum of $2^{Floor(M/2)}$ bits for distinguishing M zone IDs and $2^{Floor(N/2)}$ bits for distinguishing an actual location in each zone ID, and may transmit the SCI to the reception UE via PUCCH. Among the K bits, $2^{Floor(N/2)}$ MSB bit or the $2^{Floor(N/2)}$ LSB bit is a bit for distinguishing the actual location in each zone ID, and the remaining bits may refer to bits for distinguishing the zone ID. The method of adding a zone ID field is not limited to the above embodiment.

The UE may perform HARQ feedback operation by reconfiguring zones so that there is no zone having the same ID, according to the method described above. In another embodiment, if the reception UE and the transmission UE are located in the same zone, HARQ feedback operation is determined by reconfiguring the zones so that there is no zone having the same ID, according to the method described above. Further, if the reception UE and the transmission UE exist in different zones, HARQ feedback operation may be performed according to the embodiment of FIG. 9.

The ambiguity mentioned in FIG. 9 can be solved using one of the methods described above, the ambiguity being caused by using the same zone ID even though the transmission UE and the reception UE exist in different locations. However, there is a disadvantage that the ambiguity mentioned in FIG. 9, which is caused when the transmission UE and the reception UE use different zone IDs but are located close to each other, cannot be solved. To solve this problem, one of the methods described in FIG. 12, FIG. 13, and FIG. 14 may be used.

Figure 12:
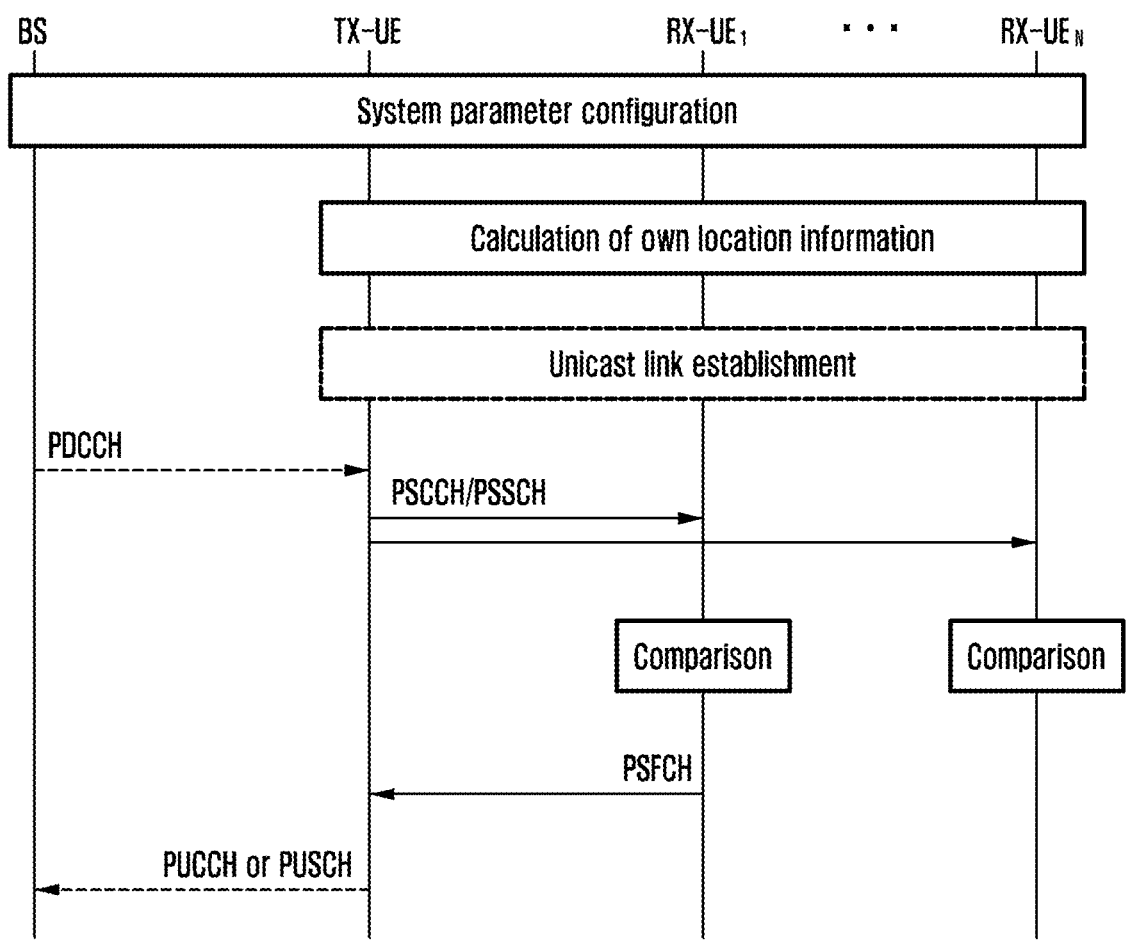
FIG. 12 shows another embodiment for transmitting location information of a transmission UE according to an embodiment of the disclosure.

FIG. 12 shows another example for transmitting location information of a transmission UE according to an embodiment of the disclosure.

As shown in FIG. 7, a transmission UE and reception UEs in FIG. 12 may receive system information for sidelink communication from a base station. A parameter for sidelink communication may be configured in the UEs having received the system information. When the transmission UE and the reception UEs are outside the coverage of the base station (out-of-coverage scenario of FIG. 1), the transmission UE and the reception UEs may have parameters for sidelink communication, which are configured in advance or configured via a sidelink master information block (SL-MIB) transmitted via a sidelink synchronization channel.

In FIG. 12, the transmission UE and the reception UE may periodically or aperiodically calculate their own location coordinates (x, y) via a global navigation satellite system (GNSS). FIG. 12 assumes a scenario in which a PC5 RRC connection is established between the transmission UE and reception UEs in a group performing groupcast communication. Therefore, the transmission UE and the reception UEs may exchange the location coordinates (x, y) thereof during a PC5 RRC connection establishment procedure.

FIG. 12 illustrates that calculation of location coordinates (x, y) of the UE is performed after receiving system parameter configuration information, but the calculation of the location coordinates (x, y) of the UE may be performed first and the system parameter configuration information may be received thereafter. If there is no base station, a system parameter configuration block of FIG. 12 may be omitted, and as mentioned in FIG. 3, preconfigured parameters may be exchanged between UEs during the unicast link establishment.

When the mode-1 resource allocation scheme illustrated in FIG. 4 is used in FIG. 12, the base station may transmit sidelink scheduling information to the groupcast transmission UE via a physical downlink control channel (PDCCH). The transmission UE having received the information may transmit sidelink control information and data information to the reception UEs via PSCCH and PSSCH, respectively, by using the scheduling information of the base station. As mentioned in FIG. 3, a destination L2 ID and a transmitter L2 ID may be included in PSCCH so as to be transmitted. 1-bit information on whether to activate or deactivate HARQ operation may be included. More specifically, even if resource pool configuration information includes PSFCH resource configuration (e.g., a PSFCH period) information for HARQ operation, the transmission UE may deactivate HARQ operation by adding information indicating the deactivation of HARQ operation to the SCI. The reasons are as follows.

In a case of broadcast communication, sidelink control information and data information are transmitted to a plurality of unspecified UEs, and thus HARQ operation in broadcast communication may be difficult. In the case of unicast and groupcast communication, HARQ operation may or may not be configured according to QoS of transmitted sidelink data. For example, some specific sidelink data has a high level of requirements for reception reliability, and therefore HARQ operation may be configured. However, other specific sidelink data does not have a high level of requirements for reception reliability, and therefore HARQ operation may be not configured. As another example, some specific sidelink data has a high level of requirement for delay in sidelink communication (that is, a delay time should be short), and therefore HARQ operation may not be configured. However, other specific sidelink data does not have a high level of requirements for a delay time (that is, a delay time may be long), and therefore HARQ operation may be configured. As described above, HARQ operation may be configured or canceled according to the QoS of sidelink data transmitted by the transmission UE. Determination on whether HARQ operation is configured may vary according to QoS, and therefore the determination may be performed in an application layer that manages QoS or a V2X layer that has received QoS from an application.

However, in this case, HARQ operation of the reception UE may not be possible. More specifically, HARQ operation should be performed in a PHY/MAC layer, but if the V2X layer or the application layer or the like controls HARQ operation, the HARQ operation cannot be performed in the PHY/MAC layer of the reception UE. That is, the PHY/MAC layer of the reception UE should be aware of whether to operate HARQ before transferring of a corresponding packet to the V2X layer or the application layer of the reception UE, and based on this, HARQ combining may be performed in the PHY layer. Therefore, for HARQ operation of the PHY/MAC layer, the transmission UE may include a 1-bit indicator indicating whether to operate HARQ, via SCI.

As illustrated in FIG. 5, a mode-2 resource allocation scheme may be used in FIG. 12. In this case, the operation in FIG. 12, in which the transmission UE receives scheduling information from the base station via the PDCCH, may be omitted.

In addition to the information described above, the transmission UE may add, to the SCI, offset information indicating a difference between its own coordinates (x, y) transmitted to the reception UE during the PC5 RRC connection establishment and coordinates (x, y) at a point in time when the transmission UE itself transmits current sidelink control information and data information, and may transmit the SCI via PSCCH. As another example, the transmission UE may add the offset information to a MAC-CE or MAC-PDU, and may transmit the MAC-CE or MAC-PDU via PSSCH. The transmission UE may determine whether to add the offset information to the SCI or MAC-CE/MAC-PDU, on the basis of its own speed or the variation amount at (x, y) and (x1, y1). More specifically, if a moving speed of the transmission UE is higher than or equal to a specific value (that is, when the moving speed is high), there may be many changes in the position of the transmission UE. For example, when assuming that the moving speed of the transmission UE is 120 km/h, the transmission UE may move 33 meters per second. Therefore, for accurate measurement of a distance between the transmission UE and the reception UE, the transmission UE may transmit a difference between previous location coordinates (x, y) and current location coordinates (x1, y1) thereof to the reception UEs via the SCI or MAC-CE/MAC-PDU. As another example, regardless of the speed of the transmission UE, if the difference between the previous location coordinates (x, y) and the current location coordinates (x1, y1) of the transmission UE has a value greater than or equal to a specific value, the transmission UE may transmit the offset value to the reception UEs via the SCI or MAC-CE/MAC-PDU. The offset information or location coordinates may be defined as location information of the transmission UE. If the SCI does not include the offset information or information on the location coordinates of the transmission UE, the reception UE may determine the location of the transmission UE on the basis of previously received location coordinate information.

The transmission UE may not only compare the location information during PC5 RRC connection establishment with the location information of the SCI, but also compare the location information of the SCI with that of subsequent SCI. For example, when the SCI is transmitted and the subsequent SCI is transmitted to the same reception UE, the offset value may correspond to an offset value from location information included in previous SCI. When determining whether the location information of the transmission UE is included in the SCI, if a difference between location coordinates of the transmission UE when transmitting the previous SCI and the location coordinates of the transmission UE that transmits the current SCI exceeds a specific value, a new coordinate value or offset value of the transmission UE may be added, and otherwise, a new coordinate value or offset value of the transmission UE may be omitted.

The transmission UE may add, to the MAC-CE or MAC-PDU, coordinate (x1, y1) values at a point in time when current sidelink control information and data information are transmitted instead of the offset information, and may transmit the MAC-CE or MAC-PDU via PSSCH. This is because, the MAC-CE or MAC-PDU is able to transmit a relatively large amount of bits compared to the SCI, so that, when the location coordinates of the transmission UE are transmitted to the MAC-CE or MAC-PDU, the transmission UE may transmit an actual coordinate (x1, y1) value, not an offset value, to the reception UEs. That is, when the PC5 RRC connection is established, the transmission UE may transmit its own coordinates (x, y) to the reception UEs, and may add, to the MAC-CE or MAC-PDU, the coordinate (x1, y1) value at a point in time when the transmission UE itself transmits current sidelink control information and data information, or the offset value between (x, y) and (x1, y1), and may transmit the MAC-CE or MAC-PDU via PS SCH. The coordinate (x1, y1) value at the point in time when the sidelink control information and data information are transmitted, or the offset value between (x, y) and (x1, y1) may be provided when distance-based HARQ operation is configured or activated. If the distance-based HARQ operation is neither configured nor activated, the coordinate (x1, y1) value at the point in time when the sidelink control information and data information are transmitted, or the offset value between (x, y) and (x1, y1) may not be provided.

As another example, the transmission UE does not transmit the location information during PC5 RRC connection establishment (that is, when establishing the PC5 RRC connection, coordinate (x, y) information is not transmitted.), if the distance-based HARQ operation is configured or activated, the transmission UE may add, to the MAC-CE or MAC-PDU, the coordinate (x1, y1) value at the point in time when the transmission UE itself transmits current sidelink control information and data information, and may transmit the MAC-CE or MAC-PDU via PSSCH.

In addition to the offset information or coordinate (x1, y1) values, the transmission UE may add, to the SCI, a range request of a sidelink data packet transmitted thereby, and may transmit the SCI via PSCCH. The range requirement is not limited to reception via the SCI, and a preconfigured value may be used for the UE, or a value configured by the base station may be used.

The reception UEs having received PSCCH and PSSCH from the transmission UE may determine whether a destination L2 ID included in the SCI of PSCCH refers to themselves, and when the destination L2 ID refers to itself (the reception UE), PSSCH may be decoded based on time and/or frequency resource allocation information of PSSCH included in the SCI. Based on PSSCH decoding, the reception UEs may finally determine whether sidelink data is transmitted to themselves, via the destination L2 ID included in a MAC-CE transmitted via PSSCH. That is, the above-described destination L2 ID is composed of N bits, and N1 bits may be transmitted via the SCI and the remaining N2 bits may be transmitted via the MAC-CE (N=N1+ N2). If it is determined that the destination L2 ID included in the received SCI does not refer to the reception UE, the reception UE may not decode PSSCH indicated by the SCI.

If PSCCH and PSSCH transmitted from the transmission UE refer to the destination L2 ID of the reception UE, the reception UE may calculate a distance between the transmission UE and itself, on the basis of its own current location information and the location information received from the transmission UE. The reception UE may acquire the location information of the transmission UE via at least one of various methods described above. For example, the reception UE may acquire current coordinates (x1, y1) of the transmission UE, by using the coordinates (x, y) transmitted when the transmission UE establishes the PC5 RRC connection, and the offset information transmitted via the SCI of PUCCH or the MAC-CE/MAC-PDU of PSSCH. As another example, the reception UE may acquire the current coordinates (x1, y1) of the transmission UE transmitted via the MAC-CE/MAC-PDU of PSSCH.

Based on the location information (x1, y1) of the transmission UE, the reception UE may calculate a distance from the transmission UE and itself. The distance between the transmission UE and reception UE-N is defined to be $d_N$. The reception UE may compare a $d_{TH}$ value with a $d_N$ value via the range requirement (defined to be $d_{TH}$) included in the received SCI information of PSCCH. The reception UE may perform HARQ operation according to a comparison result of the $d_{TH}$ and $d_N$ values. For example, if the distance between the transmission UE and the reception UE, which has been measured (calculated or obtained) by the reception UE, is greater than (or greater than or equal to) the range requirement, the reception UE may not transmit HARQ feedback information to the transmission UE regardless of whether PSSCH received thereby is successfully decoded. That is, in a case of $d_N > d_{TH}$ or $d_N \geq d_{TH}$, the reception UE may not provide HARQ feedback. Alternatively, in a case of $d_N \leq d_{TH}$ or $d_N < d_{TH}$, the reception UE may transmit HARQ feedback to the transmission UE. The reception UE may transmit HARQ-NACK to the transmission UE only when decoding of PSSCH fails. That is, even if the distance condition is satisfied, when the decoding of PSSCH is successful, HARQ-ACK may not be transmitted to the transmission UE. FIG. 7 shows an example of a case where reception UE-1 transmits HARQ-NACK to the transmission UE via PSFCH. FIG. 12 shows an example of a case where reception UE-1 transmits HARQ-NACK to the transmission UE via PSFCH.

If two or more reception UEs satisfy the condition (i.e., $d_N \leq d_{TH}$ or $d_N < d_{TH}$) and the PSSCH decoding fails, the two or more reception UEs may transmit HARQ-NACK to the transmission UE. Time/frequency/code resources of PSFCH, which are used for HARQ-NACK transmission by the two or more reception UEs may be the same. Therefore, the transmission UE having received HARQ feedback information is not required to know the number of reception UEs having transmitted NACK information, and the transmission UE having received the NACK information may perform retransmission of PSSCH. If the transmission UE does not receive NACK information and sidelink data that will be newly transmitted is generated, the transmission UE may transmit a new PSSCH. If no sidelink data to be newly transmitted is generated, the transmission UE may stop PSSCH transmission.

As illustrated in FIG. 12, the transmission UE may transmit sidelink HARQ feedback information received from the reception UE to the base station according to the configuration of the base station. Here, the sidelink HARQ feedback information may be transmitted via PUCCH or PUSCH, and specific operations may follow one of the methods described in FIG. 4 and FIG. 5.

Whether to use the sidelink HARQ operation of FIG. 6 or the sidelink HARQ operation of FIG. 12 in groupcast communication may be included in resource pool configuration information configured by the base station, or may be included in preconfigured resource pool configuration information when there is no base station. As another example, whether to apply FIG. 6 and FIG. 12 may be implicitly or explicitly indicated by the transmission UE via the SCI. As an example of an implicit indication, when the location information and range request information of the transmission UE are included in the SCI, the reception UE may indirectly recognize that the method of FIG. 12 should be used. When the location information and range requirement information of the transmission UE are not included in the SCI, the reception UE may implicitly recognize that the method of FIG. 6 should be used. As an example of an explicit indication, the transmission UE may add a 1-bit indicator to the SCI to transmit the indicator. The UE having received the indicator may apply the method of FIG. 6 if the indicator indicates "1" and may apply the method of FIG. 12 if the indicator indicates "0". Depending on a configuration, it may be configured to apply the method of FIG. 6 when the indicator indicates "0", and may apply the method of FIG. 12 when the indicator indicates "1".

The embodiment of FIG. 12 may be applied when a zone ID of the transmission UE and a zone ID of the reception UE are different. The embodiment of FIG. 12 may be applied even when the zone ID of the transmission UE and the zone ID of the reception UE are the same.

The embodiment of FIG. 12 may be applied to determination on whether to perform distance-based HARQ feedback operations, by further considering location information when the determination on whether to perform the distance-based HARQ feedback operations cannot be made via the zone ID of the transmission UE and the zone ID of the reception UE, but is not limited to.

FIG. 13 shows another example for transmitting location information of a transmission UE according to an embodiment of the disclosure.

When there is no PC5 RRC connection established between sidelink UEs in the same group performing group communication, location coordinates (x, y) of a transmission UE cannot be transmitted to reception UEs during a PC5 RRC connection establishment procedure, as mentioned in FIG. 12. In this scenario, in order to operate distance-based sidelink HARQ operation, it is required to define a time relationship between a MAC-CE/MAC PDU or an RRC message, via which location information is transmitted, and SCI, a MAC-CE/MAC PDU or RRC, via which an offset of location information is transmitted. More specifically, after [x] milliseconds (ms), [y] slot, or [z] symbol based on a point in time when the MAC-CE, MAC PDU, or RRC message, via which location information of the transmission UE is transmitted, is transmitted, the transmission UE needs to transmit the SCI, MAC-CE/MAC PDU, or RRC message, which includes an offset value for the location information of the transmission UE itself. The reception UE, which has received the SCI, MAC-CE/MAC PDU, or RRC message including the offset value for the location information of the transmission UE, may assume that, before [x] ms, [y] slot, or [z] symbol based on a reception time point of the offset value, the transmission UE has transmitted the location information via the MAC-CE, MAC PDU, or RRC message.

More specifically, as illustrated in (A) of FIG. 13, the transmission UE may transmit, in slot "n", location coordinates (x, y) of itself to the reception UEs via the MAC-CE, MAC PDU, or RRC message (the MAC-CE mentioned hereinafter may be replaced by a MAC PDU or RRC message). The MAC-CE including (x, y) of the transmission UE may be transmitted at least once during a predetermined time. That is, the transmission UE may transmit the MAC-CE including its own (x, y) during a time configured by the base station, a time configured in advance, or a fixed time. The transmission UE may transmit the MAC-CE for a number of times configured by the base station, a number of times configured in advance, or a fixed number of times during the time described above.

The number of MAC-CE transmissions may be more than one. If the number of MAC-CE transmissions is two or more, an interval of the MAC-CE transmissions may be or may not be constant. If the transmission interval is constant, the transmission interval may be configured by the base station or may be configured in advance (or may be fixed). If the MAC-CE is transmitted two or more times, the MAC-CE may transmit the same location information or different location information. For example, assume that the transmission UE transmits the MAC-CE twice, and assume that the transmission UE initially transmits the MAC-CE in slot "n" and transmits the MAC-CE for the second time in slot "n+L". In this case, the transmission UE may configure the location information thereof transmitted in slot "n" and that transmitted in slot "n+L" to be the same. That is, (x, y) may be transmitted in slot "n", and (x, y) may also be transmitted in slot "n+L". This may be applied if a moving speed of the transmission UE is equal to or lower than or is lower than a specific value (that is, when the moving speed is not high), if a value "L" is equal to or smaller than, or is smaller than a specific value, or if both of the conditions are satisfied. For example, when it is assumed that the moving speed of the transmission UE is 60 km/h, the transmission UE can move 17 meters per second (that is, the transmission UE can move 17 centimeters in 10 ms). That is, there may be no significant difference between the location coordinates of the first transmission performed by the transmission UE and the location coordinates of the second transmission performed by the transmission UE. Therefore, if the speed of the transmission UE is equal to or lower than or is lower than the specific value, the transmission UE may not need to estimate its location frequently to transmit its coordinates to the MAC-CE. In this case, the same location information may be included in the MAC-CE transmitted for the first time and second time by the transmission UE. The example described above may be applied even when the MAC-CE is transmitted three or more times.

If the moving speed of the transmission UE is equal to or higher than or is higher than a specific value (that is, if the movement speed is high), if value "L" is equal to or higher than or is higher than a specific value, or if both of the above conditions are satisfied, the transmission UE may update its location coordinates and transmit the same via the MAC-CE. For example, when it is assumed that the moving speed of the transmission UE is 120 km/h, the transmission UE can move 33 meters per second (that is, the transmission UE can move 33 centimeters in 10 ms). If value L is very large (e.g., 1000 ms=1 second), there may be a large difference between the transmission UE's location coordinates (x, y) initially transmitted by the transmission UE itself and the location coordinates (x1, y1) transmitted for the second time by the transmission UE. Therefore, for accurate measurement of a distance between the transmission UE and the reception UE, the transmission UE may update its location coordinates and transmit the same via the MAC-CE.

As another example, instead of determining conditions for the speed of the transmission UE and/or value "L", the transmission UE may calculate a difference between previous location coordinates and current location coordinates of itself, so as to determine whether to transmit the same location coordinates or to transmit updated location coordinates.

The transmission UE having transmitted (x, y) via the MAC-CE in slot "n" may transmit offset information of coordinates (x, y) and coordinates (x1, y1) in slot "n+K" via the SCI, as illustrated in (A) of FIG. 13. Alternatively, the transmission UE having transmitted (x, y) via the MAC-CE in slot "n" may transmit offset information of coordinates (x, y) and coordinates (x1, y1) in slot "n+K" via the MAC-CE, as illustrated in (B) of FIG. 13. An offset value included in the SCI or MAC-CE may be always included in the SCI or MAC-CE information if the distance-based HARQ operation is configured or activated, and the transmission UE transmits sidelink data. As another example, the transmission UE may determine whether to transmit the offset information transmitted via the SCI or MAC-CE, in consideration of the moving speed of the transmission UE itself, value "K", or both conditions. That is, if the location coordinates (x, y) transmitted by the transmission UE via the MAC-CE in the slot "n" and the location coordinates in slot "n+K" have values equal to or smaller than a specific value or have values smaller than the specific value, the transmission UE may not include offset information in the SCI (or a field corresponding to the offset information in the SCI may be set to 0). Likewise, if the location coordinates (x, y) transmitted by the transmission UE via the MAC-CE in slot "n" and the location coordinates in slot "n+K" have values equal to or smaller than or values smaller than a specific value, the transmission UE may not include the offset information in the MAC-CE. If the location information of the transmission UE or offset information is not included in the SCI or MAC CE, the reception UE may determine the location of the transmission UE on the basis of previously received location information of the MAC CE.

The reception UE having received the location coordinates via the MAC-CE from the transmission UE in slot "n" is required to know that the offset information of the coordinates of the transmission UE will be transmitted via the SCI or MAC-CE in slot "n+K". A value configured by the base station, a value configured in advance, or a fixed value may be used for value "K". If the reception UE has received the offset information for the coordinates of the transmission UE via the SCI or MAC-CE in slot "n+K", but has failed to receive the coordinates of the transmission UE via the MAC-CE in slot "n" (that is, if the reception UE has failed to receive the MAC-CE, or decoding fails), the reception UE may not transmit HARQ feedback to the transmission UE. In this case, the reception UE may transmit, to the transmission UE, information for requesting location information. If the reception UE is unable to determine the location coordinate information of the transmission UE, the reception UE may check a distance between the transmission UE and itself or may determine a location relationship with the transmission UE, on the basis of zone information based on a zone identifier, and may perform the distance-based HARQ feedback operation.

In the embodiment of FIG. 13, it has been described that offset information is provided via SCI or MAC CE in slot n+K, but coordinate information of the transmission UE may be transmitted instead of offset information. For example, if an offset value cannot be displayed in an offset field due to the size of the offset value, and if it is determined that previously received coordinate information of the transmission UE is invalid over the time lapse of K, coordinate information of the transmission UE may be transmitted.

Figure 14:
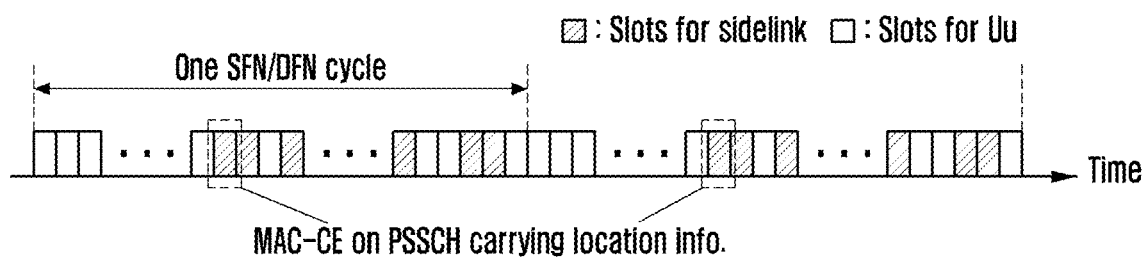
FIG. 14 shows another embodiment for transmitting location information of a transmission UE according to an embodiment of the disclosure.

FIG. 14 shows another example for transmitting location information of a transmission UE according to an embodiment of the disclosure.

FIG. 14 illustrates a case in which frame synchronization is performed between a sidelink transmitting UE and sidelink receiving UEs, which perform groupcast communication within the same group. More specifically, a sidelink UE (located 1-hop from a base station), which directly selects a base station as a sidelink synchronization source, or a sidelink UE (located 2-hop from the base station, and performing synchronization on a synchronization signal of another UE synchronized with the base station), which indirectly selects the base station as the sidelink synchronization source, may perform synchronization with a system frame number (SFN) of the base station. For example, the base station may configure a starting point of a sidelink resource pool to the sidelink UEs via a slot offset, on the basis of base station system frame number 0. To this end, all the sidelink transmission UEs and sidelink reception UEs in the base station should be synchronized with a system frame number of the base station (that is, system frame number 0 considered by the base station and system frame number 0 considered by the sidelink transmitting UE and the sidelink receiving UE are the same). Sidelink UEs (located in 1-hop from the GNSS), which directly select the global navigation satellite system (GNSS) as a sidelink synchronization signal source, or sidelink UEs (located in 2-hop from the GNSS, and synchronized with a synchronization signal of another UE directly synchronized with the GNSS), which indirectly select the GNSS as the sidelink synchronization signal source, may perform frame synchronization using a direct frame number (DFN) via a synchronization signal of the GNSS. That is, UEs that have selected the GNSS as a sidelink synchronization signal source may match DFNs therebetween. Lastly, sidelink UEs (located in 2-hop from S-SSB), which directly select a sidelink synchronization signal block (S-SSB) transmitted by the UE, as a sidelink synchronization signal source, or sidelink UEs (located in 2-hop from S-SSB, and synchronized with a synchronization signal of another UE directly synchronized with the S-SSB transmission UE), which indirectly selects the S-SSB as the sidelink synchronization signal source, may perform frame synchronization using a direct frame number (DFN) via the S-SSB. That is, UEs that have selected the S-SSB transmitted by the UE, as the sidelink synchronization signal source may match the DFNs therebetween.

With respect to which synchronization signal is prioritized when performing sidelink synchronization, from among the synchronization signal of the base station, the synchronization signal of the GNSS, and the S-SSB transmitted by the UE, rules configured by the base station, rules configured in advance, or pre-defined rules may be followed. By these rules, the transmitting UE and the receiving UEs performing sidelink groupcast communication may match SFNs or DFNs.

Under this assumption, as illustrated in FIG. 14, the transmitting UE may transmit a MAC-CE including its own coordinates (x, y) to the receiving UEs via PSSCH at least once within an SFN or DFN cycle. Based on this, as illustrated in FIG. 13, it is necessary to define a time relationship between an MAC-CE, via which location coordinates (x, y) are transmitted, and SCI or an MAC-CE, via which an offset of location information is transmitted.

More specifically, after [x] ms, [y] slot, or [z] symbol based on a point in time when the MAC-CE, via which location information of the transmission UE is transmitted, is transmitted, the transmission UE needs to transmit the SCI or MAC-CE, which includes an offset value for the location information of the transmission UE itself. The reception UE, which has received the SCI or MAC-CE including the offset value for the location information of the transmitting UE, may assume that, before [x] ms, [y] slot, or [z] symbol based on a reception time point of the offset value, the transmission UE has transmitted the location information via the MAC-CE.

For example, as illustrated in FIG. 14, the transmitting UE may transmit its location coordinates (x, y) to the receiving UEs via the MAC-CE within one SFN or DFN cycle. The MAC-CE including (x, y) of the transmitting UE may be transmitted at least once for a predetermined time period after slot Z1 based on SFN 0 or DFN 0 in the SFN or DFN cycle (or after slot Z2 based on a slot in which a sidelink resource is started within the SFN/DFN cycle). That is, the transmission UE may transmit the MAC-CE including (x, y) of the transmission UE itself for a time configured by the base station, a time configured in advance, or a fixed time, after slot Z1 based on SFN 0 or DFN 0 within the SFN or DFN cycle. As another example, the transmission UE may transmit the MAC-CE including (x, y) of the transmission UE itself for a time configured by the base station, a time configured in advance, or a fixed time, after slot Z2 based on a slot in which a sidelink resource is started within the SFN/DFN cycle. In the examples described above, Z1=Z2=0 is not excluded. Here, Z1 and Z2 values may be configured by the base station, may be configured in advance, or may be fixed values.

The transmitting UE may perform transmission for a time configured by a base station, a time configured in advance, or a fixed time, within the SFN or DFN cycle. The number of MAC-CE transmissions may be more than one. If the number of MAC-CE transmissions is two or more, an interval of the MAC-CE transmissions may be or may not be constant. If a transmission interval is constant, the transmission interval may be configured by the base station or may be configured in advance. If the MAC-CE is transmitted two or more times, the MAC-CE may transmit the same location information or different location information. For example, assume that the transmission UE transmits the MAC-CE twice, and assume that the transmission UE initially transmits the MAC-CE in slot "n" and transmits the MAC-CE for the second time in slot "n+L". In this case, the transmission UE may configure the location information thereof transmitted in slot "n" and that transmitted in slot "n+L" to be the same. That is, (x, y) may be transmitted in slot "n", and (x, y) may also be transmitted in slot "n+L". This may be applied if a moving speed of the transmission UE is equal to or lower than or is lower than a specific value (that is, when the moving speed is not high), if a value "L" is equal to or smaller than, or is smaller than a specific value, or if both of the conditions are satisfied. For example, when it is assumed that the moving speed of the transmission UE is 60 km/h, the transmission UE can move 17 meters per second (that is, the transmission UE can move 17 centimeters in 10 ms). That is, there may be no significant difference between the location coordinates of the first transmission performed by the transmission UE and the location coordinates of the second transmission performed by the transmission UE. Therefore, if the speed of the transmission UE is equal to or lower than or is lower than the specific value, the transmission UE may not need to estimate its location frequently to transmit its coordinates to the MAC-CE. In this case, the same location information may be included in the MAC-CE transmitted for the first time and second time by the transmission UE. The example described above may be applied even when the MAC-CE is transmitted three or more times.

If the moving speed of the transmission UE is equal to or higher than or is higher than a specific value (that is, if the movement speed is high), if value "L" is equal to or higher than or is higher than a specific value, or if both of the above conditions are satisfied, the transmission UE may update its location coordinates and transmit the same via the MAC-CE. For example, when it is assumed that the moving speed of the transmission UE is 120 km/h, the transmission UE can move 33 meters per second (that is, the transmission UE can move 33 centimeters in 10 ms). If value L is very large (e.g., 1000 ms=1 second), there may be a large difference between the transmission UE's location coordinates (x, y) initially transmitted by the transmission UE itself and the location coordinates (x1, y1) transmitted for the second time by the transmission UE. Therefore, for accurate measurement of a distance between the transmission UE and the reception UE, the transmission UE may update its location coordinates and transmit the same via the MAC-CE.

As another example, instead of determining conditions for the speed of the transmission UE and/or value "L", the transmission UE may calculate a difference between previous location coordinates and current location coordinates of itself, so as to determine whether to transmit the same location coordinates or to transmit updated location coordinates.

As another example, when transmitting sidelink data, the transmitting UE may always transmit its coordinates via the MAC-CE. Coordinate information may be (x, y) described above (i.e., initial location coordinates) or may be coordinates at the time of transmitting the current MAC-CE.

The transmission UE having transmitted (x, y) via the MAC-CE in slot "n" may transmit offset information of coordinates (x, y) and coordinates (x1, y1) via the SCI or MAC-CE in slot "n+K", as illustrated in FIG. 13. An offset value included in the SCI or MAC-CE may be always included in the SCI or MAC-CE information if the distance-based HARQ operation is configured or activated, and the transmission UE transmits sidelink data.

As another example, the transmission UE may determine whether to transmit the offset information transmitted via the SCI or MAC-CE, in consideration of the moving speed of the transmission UE itself, value "K", or both conditions. That is, if the location coordinates (x, y) transmitted by the transmission UE via the MAC-CE in the slot "n" and the location coordinates in slot "n+K" have values equal to or smaller than a specific value or have values smaller than the specific value, the transmission UE may not include offset information in the SCI (or a field corresponding to the offset information in the SCI may be set to 0). Likewise, if the location coordinates (x, y) transmitted by the transmission UE via the MAC-CE in slot "n" and the location coordinates in slot "n+K" have values equal to or smaller than or values smaller than a specific value, the transmission UE may not include the offset information in the MAC-CE. If the location information of the transmission UE or offset information is not included in the SCI or MAC CE, the reception UE may determine the location of the transmission UE on the basis of previously received location information of the MAC CE.

The reception UE having received the location coordinates via the MAC-CE from the transmission UE in slot "n" is required to know that the offset information of the coordinates of the transmission UE will be transmitted via the SCI or MAC-CE in slot "n+K". A value configured by the base station, a value configured in advance, or a fixed value may be used for value "K". If the reception UE has received the offset information for the coordinates of the transmission UE via the SCI or MAC-CE in slot "n+K", but has failed to receive the coordinates of the transmission UE via the MAC-CE in slot "n" (that is, if the reception UE has failed to receive the MAC-CE, or decoding fails), the reception UE may not transmit HARQ feedback to the transmission UE. In this case, the reception UE may transmit, to the transmission UE, information for requesting location information. If the reception UE is unable to determine the location coordinate information of the transmission UE, the reception UE may check a distance between the transmission UE and itself or may determine a location relationship with the transmission UE, on the basis of zone information based on a zone identifier, and may perform the distance-based HARQ feedback operation.

For example, if the cycle of the SFN or DFN is changed in FIG. 14, the transmitting UE may update its coordinates (x, y) transmitted at latest in the previous SFN or DFN cycle, and may transmit new coordinates (x', y') to the receiving UEs via the MAC-CE. A slot in which the new coordinates (x', y') are transmitted, the number of transmissions, and a transmission time may be the same as the above-described method. That is, the operations in the SFN or DFN cycle may be equally applied in a subsequent SFN or DFN cycle.

Figure 15:
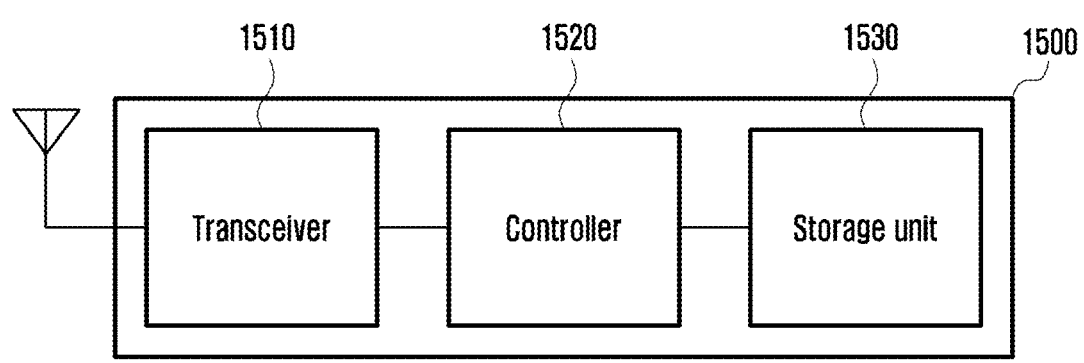
FIG. 15 is a diagram illustrating a structure of a transmission UE according to an embodiment of the disclosure.

FIG. 15 is a diagram illustrating a structure of a transmission UE according to an embodiment of the disclosure.

Referring to FIG. 15, a transmission UE 1500 in the disclosure may include a transceiver 1510, a controller 1520, and a storage unit 1530. The transceiver 1510 may transmit a signal to and receive a signal from a base station or another UE. The signal may include a synchronization signal, a reference signal, control information, and data. To this end, the transceiver 1510 may include an RF transmitter configured to perform up-conversion and amplification of a frequency of a transmitted signal, an RF receiver configured to perform low-noise amplification of a received signal and perform down-conversion of a frequency, and the like. Further, the transceiver 1510 may receive a signal via a wireless channel, may output the signal to the controller 1520, and may transmit a signal output from the controller 1520 via the wireless channel. The controller 1520 may control a series of procedures so as to enable the transmitting UE 1500 to perform operations according to the embodiments of the disclosure. The controller 1520 may include at least one processor.

Figure 16:
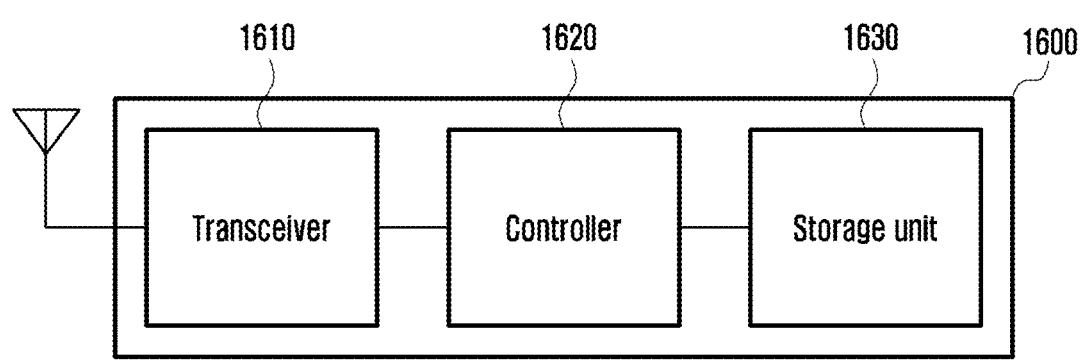
FIG. 16 is a diagram illustrating a structure of a reception UE according to an embodiment of the disclosure.

FIG. 16 is a diagram illustrating a structure of a reception UE according to an embodiment of the disclosure.

Referring to FIG. 16, a reception UE 1600 in the disclosure may include a transceiver 1610, a controller 1620, and a storage unit 1630. The transceiver 1610 may transmit a signal to and receive a signal from a base station or another UE. The signal may include a synchronization signal, a reference signal, control information, and data. To this end, the transceiver 1610 may include an RF transmitter configured to perform up-conversion and amplification of a frequency of a transmitted signal, an RF receiver configured to perform low-noise amplification of a received signal and perform down-conversion of a frequency, and the like. Further, the transceiver 1610 may receive a signal via a wireless channel, may output the signal to the controller 1620, and may transmit a signal output from the controller 1620 via the wireless channel. The controller 1620 may control a series of procedures so as to enable the reception UE to perform operation according to the embodiments of the disclosure. The controller 1620 may include at least one processor.

Figure 17:
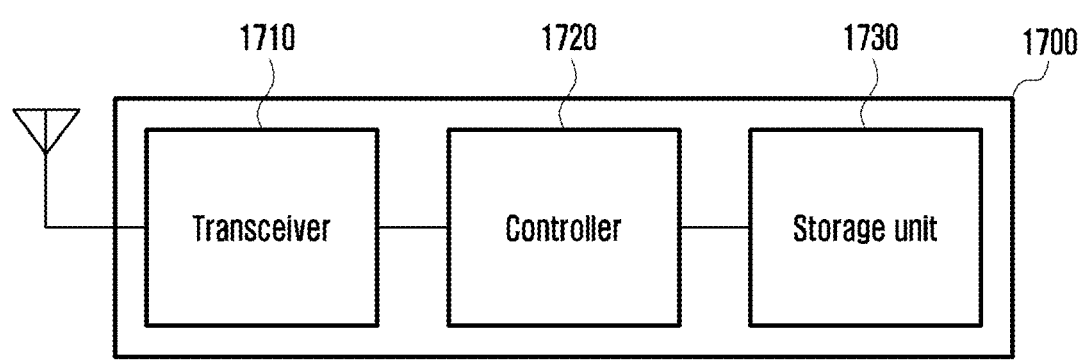
FIG. 17 is a diagram illustrating a structure of a transmission base station according to an embodiment of the disclosure.

FIG. 17 is a diagram illustrating a structure of a base station according to embodiments of the disclosure.

Referring to FIG. 17, a base station 1700 of the disclosure may include a transceiver 1710, a controller 1720, and a storage 1730. The transceiver 1710 may transmit a signal to and receive a signal from a base station or another UE. The signal may include a synchronization signal, a reference signal, control information, and data. To this end, the transceiver 1710 may include an RF transmitter configured to perform up-conversion and amplification of a frequency of a transmitted signal, an RF receiver configured to perform low-noise amplification of a received signal and perform down-conversion of a frequency, and the like. Further, the transceiver 1710 may receive a signal via a wireless channel, may output the signal to the controller 1720, and may transmit a signal output from the controller 1720 via the wireless channel. The controller 1720 may control a series of procedures so as to enable a UE to perform operations according to the embodiments of the disclosure. The controller 1720 may include at least one processor.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first terminal in a wireless communication system, the method comprising:
    obtaining resource pool information associated with a sidelink, the resource pool information including information on a period and information on a resource block (RB) for a physical sidelink feedback channel (PSFCH);
    transmitting sidelink control information (SCI) associated with sidelink data on a physical sidelink control channel (PSCCH), the SCI including a zone identity (ID) of the first terminal, information on a range requirement, a first part of a destination ID of a second terminal and an indicator indicating a hybrid automatic repeat request (HARQ) enabled;
    transmitting the sidelink data on a physical sidelink shared channel (PSSCH) based on the SCI, the sidelink data including a second part of the destination ID of the second terminal; and
    receiving feedback information associated with the sidelink data from the second terminal based on the information on the period and the information on the RB, in case that a distance between the first terminal and the second terminal is smaller or equal to the range requirement,
    wherein the distance between the first terminal and the second terminal is identified based on a center location of a zone indicated by the zone ID and a location of the second terminal.

2. The method of claim 1, wherein the feedback information associated with the sidelink data is used for a negative acknowledgement.

3. The method of claim 1, wherein the distance between the first terminal and the second terminal is not considered for the feedback information associated with the sidelink data, in case that the zone ID of the first terminal is not provided to the second terminal.

4. A method performed by a second terminal in a wireless communication system, the method comprising:
    obtaining resource pool information associated with a sidelink, the resource pool information including information on a period and information on a resource block (RB) for a physical sidelink feedback channel (PSFCH);
    receiving, from a first terminal, sidelink control information (SCI) associated with sidelink data on a physical sidelink control channel (PSCCH), the SCI including a zone identity (ID) of the first terminal, information on a range requirement, a first part of a destination ID of the second terminal and an indicator indicating a hybrid automatic repeat request (HARQ) enabled;
    receiving, from the first terminal, the sidelink data on a physical sidelink shared channel (PSSCH) based on the SCI, the sidelink data including a second part of the destination ID of the second terminal; and
    transmitting feedback information associated with the sidelink data to the first terminal based on the information on the period and the information on the RB, in case that a distance between the first terminal and the second terminal is smaller or equal to the range requirement,
    wherein the distance between the first terminal and the second terminal is identified based on a center location of a zone indicated by the zone ID and a location of the second terminal.

5. The method of claim 4, wherein the feedback information associated with the sidelink data is used for a negative acknowledgement.

6. The method of claim 4, wherein the distance between the first terminal and the second terminal is not considered for the feedback information associated with the sidelink data, in case that the zone ID of the first terminal is not provided to the second terminal.

7. A first terminal in a wireless communication system, the first terminal comprising:
    a transceiver; and
    a controller configured to:
        obtain resource pool information associated with a sidelink, the resource pool information including information on a period and information on a resource block (RB) for a physical sidelink feedback channel (PSFCH),
        transmit, via the transceiver, sidelink control information (SCI) associated with sidelink data on a physical sidelink control channel (PSCCH), the SCI including a zone identity (ID) of the first terminal, information on a range requirement, a first part of a destination ID of a second terminal and an indicator indicating a hybrid automatic repeat request (HARQ) enabled, transmit, via the transceiver, the sidelink data on a physical sidelink shared channel (PSSCH) based on the SCI, the sidelink data including a second part of the destination ID of the second terminal, and receive feedback information associated with the sidelink data from the second terminal based on the information on the period and the information on the RB, in case that a distance between the first terminal and the second terminal is smaller or equal to the range requirement, wherein the distance between the first terminal and the second terminal is identified based on a center location of a zone indicated by the zone ID and a location of the second terminal.

8. The first terminal of claim 7, wherein the feedback information associated with the sidelink data is used for a negative acknowledgement.

9. The first terminal of claim 7 wherein the distance between the first terminal and the second terminal is not considered for the feedback information associated with the sidelink data, in case that the zone ID of the first terminal is not provided to the second terminal.

10. A second terminal in a wireless communication system, the second terminal comprising:
a transceiver; and
a controller configured to:
obtain resource pool information associated with a sidelink, the resource pool information including information on a period and information on a resource block (RB) for a physical sidelink feedback channel (PSFCH), receive, from a first terminal via the transceiver, sidelink control information (SCI) associated with sidelink data on a physical sidelink control channel (PSCCH), the SCI including a zone identity (ID) of the first terminal, information on a range requirement, a first part of a destination ID of the second terminal and an indicator indicating a hybrid automatic repeat request (HARQ) enabled, receive, from the first terminal via the transceiver, the sidelink data on a physical sidelink shared channel (PSSCH) based on the SCI, the sidelink data including a second part of the destination ID of the second terminal, and transmit feedback information associated with the sidelink data to the first terminal based on the information on the period and the information on the RB, in case that a distance between the first terminal and the second terminal is smaller or equal to the range requirement, wherein the distance between the first terminal and the second terminal is identified based on a center location of a zone indicated by the zone ID and a location of the second terminal.

11. The second terminal of claim 10, wherein the feedback information associated with the sidelink data is used for a negative acknowledgement.

12. The second terminal of claim 10, wherein the distance between the first terminal and the second terminal is not considered for the feedback information associated with the sidelink data, in case that the zone ID of the first terminal is not provided to the second terminal.

13. The method of claim 1, wherein the zone ID is obtained based on:
$x1 = \text{Floor}(x/L) \bmod Nx$;
$y1 = \text{Floor}(y/W) \bmod Ny$; and
Zone ID=$y1*Nx+x1$, where the L corresponds to a zone length, the W corresponds to a zone width, the Nx corresponds to a value associated with a longitude, Ny corresponds to a value associated with latitude, the x corresponds to a longitude position of the first terminal, and the y corresponds to a latitude position of the first terminal.

14. The method of claim 4, wherein the zone ID is obtained based on:
$x1 = \text{Floor}(x/L) \bmod Nx$;
$y1 = \text{Floor}(y/W) \bmod Ny$; and
Zone ID=$y1*Nx+x1$, where the L corresponds to a zone length, the W corresponds to a zone width, the Nx corresponds to a value associated with a longitude, Ny corresponds to a value associated with latitude, the x corresponds to a longitude position of the first terminal, and the y corresponds to a latitude position of the first terminal.

15. The first terminal of claim 7, wherein the zone ID is obtained based on:
$x1 = \text{Floor}(x/L) \bmod Nx$;
$y1 = \text{Floor}(y/W) \bmod Ny$; and
Zone ID=$y1*Nx+x1$, where the L corresponds to a zone length, the W corresponds to a zone width, the Nx corresponds to a value associated with a longitude, Ny corresponds to a value associated with latitude, the x corresponds to a longitude position of the first terminal, and the y corresponds to a latitude position of the first terminal.

16. The second terminal of claim 10, wherein the zone ID is obtained based on:
$x1 = \text{Floor}(x/L) \bmod Nx$;
$y1 = \text{Floor}(y/W) \bmod Ny$; and
Zone ID=$y1*Nx+x1$, where the L corresponds to a zone length, the W corresponds to a zone width, the Nx corresponds to a value associated with a longitude, Ny corresponds to a value associated with latitude, the x corresponds to a longitude position of the first terminal, and the y corresponds to a latitude position of the first terminal.

* * * * *